United States Patent
Walker et al.

(10) Patent No.: US 8,979,627 B2
(45) Date of Patent: Mar. 17, 2015

(54) METHOD AND APPARATUS FOR DISPLAYING GAMING CONTENT

(71) Applicant: IGT, Reno, NV (US)

(72) Inventors: Jay S. Walker, Ridgefield, CT (US); Russell P. Sammon, San Francisco, CA (US); Stephen Tulley, Monroe, CT (US); Daniel E. Tedesco, Shelton, CT (US); Robert C. Tedesco, Fairfield, CT (US); Jeffrey Y. Hayashida, San Francisco, CA (US)

(73) Assignee: IGT, Las Vegas, NV (US)

(*) Notice: Subject to any disclaimer, the term of this patent is extended or adjusted under 35 U.S.C. 154(b) by 6 days.

(21) Appl. No.: 13/896,757

(22) Filed: May 17, 2013

(65) Prior Publication Data

US 2013/0252717 A1    Sep. 26, 2013

Related U.S. Application Data

(60) Continuation of application No. 13/860,283, filed on Apr. 10, 2013, which is a division of application No. 12/236,736, filed on Sep. 24, 2008, now Pat. No. 8,435,115.

(60) Provisional application No. 60/975,313, filed on Sep. 26, 2007.

(51) Int. Cl.
*A63F 9/24* (2006.01)
*A63F 13/00* (2014.01)
*G07F 17/32* (2006.01)

(52) U.S. Cl.
CPC ............ *G07F 17/32* (2013.01); *A63F 13/00* (2013.01); *G07F 17/3227* (2013.01); *G07F 17/3232* (2013.01)

USPC ............... 463/16; 463/20; 463/25; 463/29; 463/31

(58) Field of Classification Search
USPC .................................. 463/16, 20, 25
See application file for complete search history.

(56) References Cited

U.S. PATENT DOCUMENTS

| | | | |
|---|---|---|---|
| 4,805,907 A * | 2/1989 | Hagiwara | 463/26 |
| 7,070,505 B2 | 7/2006 | Vancura et al. | |
| 7,077,746 B2 | 7/2006 | Torango | |
| 7,175,522 B2 | 2/2007 | Hartl | |
| 7,201,658 B2 | 4/2007 | Marshall et al. | |
| 7,618,319 B2 | 11/2009 | Casey et al. | |
| 7,662,040 B2 | 2/2010 | Englman et al. | |
| 7,837,562 B2 | 11/2010 | Griswold et al. | |
| 8,109,821 B2 | 2/2012 | Kovacs | |
| 8,251,816 B2 | 8/2012 | Gagner et al. | |
| 8,267,791 B2 | 9/2012 | Sugiyama et al. | |
| 8,300,046 B2 | 10/2012 | Naito et al. | |
| 8,460,087 B2 | 6/2013 | Michel | |
| 2001/0039510 A1 | 11/2001 | Galomb | |
| 2002/0142846 A1 | 10/2002 | Paulsen | |
| 2003/0064800 A1 | 4/2003 | Jackson et al. | |
| 2004/0015423 A1 | 1/2004 | Walker et al. | |

(Continued)

*Primary Examiner* — Omkar Deodhar
(74) *Attorney, Agent, or Firm* — Neal, Gerber & Eisenberg LLP

(57) ABSTRACT

A method comprises receiving an indication of a triggering event at a gaming device, determining a gaming content associated with the gaming device, identifying a public display on which is displayed non-gaming media content, and outputting the gaming content on the public display wherein the gaming content supersedes at least a portion of the non-gaming media content.

20 Claims, 15 Drawing Sheets

(56) References Cited

U.S. PATENT DOCUMENTS

| | | |
|---|---|---|
| 2004/0127284 A1 | 7/2004 | Walker et al. |
| 2004/0128157 A1 | 7/2004 | Aquilino et al. |
| 2005/0218590 A1 | 10/2005 | O'Halloran et al. |
| 2007/0105613 A1 | 5/2007 | Adams et al. |
| 2008/0009344 A1 | 1/2008 | Graham et al. |
| 2008/0102916 A1 | 5/2008 | Kovacs et al. |
| 2008/0300049 A1 | 12/2008 | Anderson et al. |
| 2010/0075760 A1 | 3/2010 | Shimabukuro et al. |

* cited by examiner

| PLAYER ID 512 | COMP STATUS 514 |
|---|---|
| 047328937 | GOLD |
| 047920138 | PLATINUM |
| 907213337 | GOLD |
| ″ | |
| ″ | |
| ″ | |
| ″ | |

| GAMING CONTENT PREEMPTION METHOD 810 | PLAYER COMP POINTS NEEDED TO DISPLAY GAMING CONTENT 815 |
|---|---|
| PICTURE-IN-PICTURE, SINGLE PLAYER OUTCOMES-TEXT ONLY | 200 |
| SCROLLING TICKER, SINGLE PLAYER OUTCOMES | 400 |
| SCROLLING TICKER, TOURNAMENT OUTCOMES | 400 |
| PICTURE-IN-PICTURE, SINGLE PLAYER OUTCOMES-WITH GRAPHICS | 600 |
| SCROLLING TICKER, SINGLE PLAYER OUTCOMES WITH GRAPHICS | 600 |
| SPLIT SCREEN, TOURNAMENT LEADERBOARD | 800 |
| PRE-EMPT COMMERCIAL BREAK, TOURNAMENT LEADERBOARD | 600 |
| SPLIT SCREEN, JACKPOT WIN | 800 |
| PRE-EMPT STANDARD VIDEO CONTENT, JACKPOT WIN | 2000 |
| SPLIT SCREEN, MAGIC MOMENTS REPLAY | 1600 |
| SPLIT SCREEN, FACE OFF MATCH | 1600 |
| SPLIT SCREEN, VIRTUAL TABLE | 2000 |
| FULL SCREEN VIRTUAL TABLE | 3000 |

| DISPLAY ID 910 | DISPLAY LOCATION 912 | DISPLAY SIZE 914 | DISPLAY TYPE 916 | PLAYER ELIGIBILITY REQUIREMENT 918 | DISPLAY STATUS 920 |
|---|---|---|---|---|---|
| 0501 | FRONT DESK | 24" | LCD | GOLD STATUS | UNAVAILABLE |
| 0601 | FRONT DESK | 26" | LCD | PLATINUM STATUS | AVAILABLE |
| 0632 | CASINO BAR #1 | 32" | CRT | NONE ALL ELIGIBLE | TV BROADCAST |
| 1052 | CASINO BAR #3 | 50" | PLASMA | $5 MIN WAGER AND GOLD STATUS | OUT OF SERVICE |
| 1055 | CASINO BAR #3 | 50" | PLASMA | $5 MIN WAGER AND GOLD STATUS | PROMOTIONAL VIDEO |

| GAMING DEVICE IDENTIFIER 1510 | GAMING DEVICE TYPE 1520 | GAMING DEVICE LOCATION 1530 |
|---|---|---|
| G-10G-3998-42 | VIDEO BLACKJACK | CASINO 1, AREA B-3 |
| G-20-0013-55 | VIDEO POKER | CASINO 1, AREA C-1 |
| G-20-9981-03 | VIDEO POKER | CASINO 1, AREA C-1 |
| G-50-7712-99 | ELECTRONIC REELED SLOT | CASINO 2, AREA B-7 |

FIG. 15

METHOD AND APPARATUS FOR DISPLAYING GAMING CONTENT

PRIORITY CLAIM

This application is a continuation of, claims priority to and the benefit of U.S. patent application Ser. No. 13/860,283, filed on Apr. 10, 2013 which is a divisional of, claims priority to and the benefit of U.S. patent application Ser. No. 12/236,736, filed on Sep. 24, 2008, which claims priority to and the benefit of U.S. Provisional Patent Application No. 60/975,313, filed on Sep. 26, 2007, the entire contents of which are each incorporated by reference herein.

FIELD OF THE INVENTION

The present disclosure relates to the display of gaming output and more particularly displaying gaming output on a public display.

BRIEF DESCRIPTION OF THE DRAWINGS

FIG. 5 is a tabular representation of an exemplary and non-limiting embodiment of a player database described herein.

FIG. 8 is a tabular representation of an exemplary and non-limiting embodiment of a gaming content eligibility database described herein.

FIG. 9 is a tabular representation of an exemplary and non-limiting embodiment of a database of public displays described herein.

FIG. 15 is a tabular representation of an exemplary and non-limiting embodiment of a gaming device database described herein.

DETAILED DESCRIPTION

Figure 1:
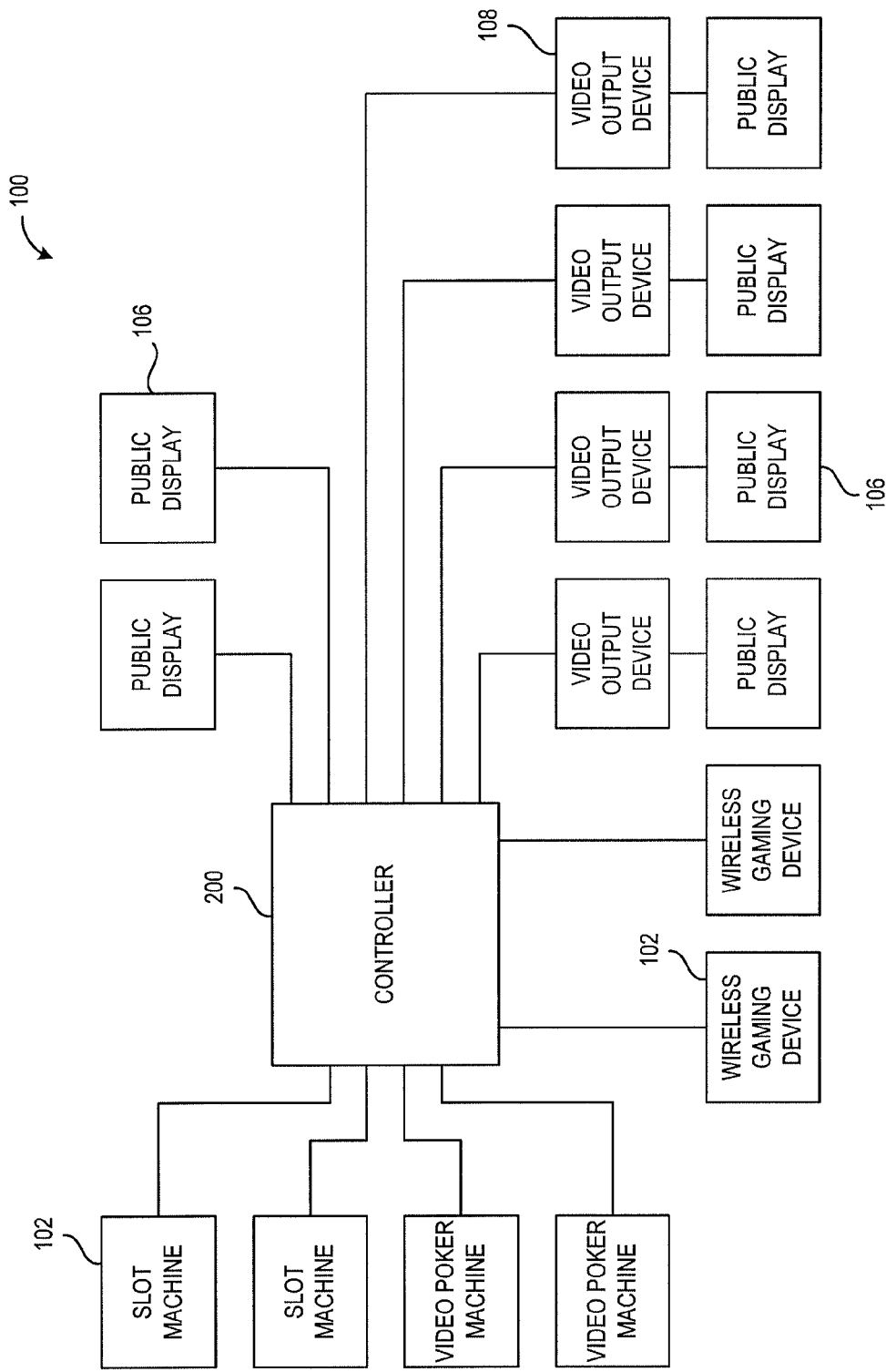
FIG. 1 is an illustration of an exemplary and non-limiting embodiment of a system for practicing one or more embodiments described herein.

As described below in accordance with various exemplary and non-limiting embodiments, gaming content, such as from one or more gaming devices 102, is combined with non-gaming media content for display on one or more public displays 106.

In accordance with an exemplary and non-limiting embodiment, a method comprises receiving an indication of a triggering event at a gaming device, determining a gaming content associated with the gaming device, identifying a public display on which is displayed non-gaming media content, and outputting the gaming content on the public display wherein the gaming content supersedes at least a portion of the non-gaming media content.

In accordance with another exemplary and non-limiting embodiment, a computer readable medium stores instructions configured to direct a processor to perform a method comprising receiving an indication of a triggering event at a gaming device, determining a gaming content associated with the gaming device, identifying a public display on which is displayed non-gaming media content, and outputting the gaming content on the public display wherein the gaming content supersedes at least a portion of the non-gaming media content.

In accordance with another exemplary and non-limiting embodiment, an apparatus comprises a processor and a computer readable medium in communication with the processor and storing instructions configured to direct the processor to perform a method comprising receiving an indication of a triggering event at a gaming device, determining a gaming content associated with the gaming device, identifying a public display on which is displayed non-gaming media content, and outputting the gaming content on the public display wherein the gaming content supersedes at least a portion of the non-gaming media content.

In accordance with another exemplary and non-limiting embodiment, a method comprises receiving a request from a player to output gaming content on a public display wherein the request comprises a selection of the public display by the player, and determining to output the gaming content on the public display.

In accordance with another exemplary and non-limiting embodiment, a computer readable medium stores instructions configured to direct a processor to perform a method comprising receiving a request from a player to output gaming content on a public display wherein the request comprises a selection of the public display by the player, and determining to output the gaming content on the public display.

In accordance with another exemplary and non-limiting embodiment, an apparatus comprises a processor and a computer readable medium in communication with the processor and storing instructions configured to direct the processor to perform a method comprising receiving a request from a player to output gaming content on a public display wherein the request comprises a selection of the public display by the player, and determining to output the gaming content on the public display.

In accordance with another exemplary and non-limiting embodiment, a method comprises determining a public display on which is displayed a first video output, determining control of the public display by at least one player of a gaming device, and displaying on the public display the first video output and a second video output associated with an output of the gaming device.

In accordance with another exemplary and non-limiting embodiment, a computer readable medium stores instructions configured to direct a processor to perform a method comprising determining a public display on which is displayed a first video output, determining control of the public display by at least one player of a gaming device, and displaying on the public display the first video output and a second video output associated with an output of the gaming device.

In accordance with another exemplary and non-limiting embodiment, an apparatus comprises a processor and a computer readable medium in communication with the processor and storing instructions configured to direct the processor to perform a method comprising determining a public display on which is displayed a first video output, determining control of the public display by at least one player of a gaming device, and displaying on the public display the first video output and a second video output associated with an output of the gaming device.

In accordance with at least one exemplary and non-limiting embodiment there is provided a method of extending the display of gaming content associated with a first gaming device to one or more other devices, such that those not normally able to view the content may see it. For example, a winning outcome or near-winning outcome achieved by a first player on a first wireless gaming device may be "duplicated" for public presentation on the television screen associated with the gaming sponsor (i.e. on a television screen in a casino's bar). There is further enabled one or more players using personal gaming devices to more easily view gaming content on a larger public display. In some embodiments, gaming content, such as the occurrence of a bonus round, may displace some or all of a television broadcast for a brief moment, with the broadcast resuming in its entirety following the related gaming content. Sensitive, confidential or otherwise personal information associated with a player of a first gaming device (e.g. a wireless, handheld gaming device) may be redacted, blurred, deleted or otherwise modified so that gaming content rendered on a public display is appropriate for public viewing.

In accordance with another exemplary embodiment, a player may be required to qualify for control of a public display's output prior to gaming content being output on the public display. Information such as a player's achieved outcomes, comp level status or win/loss total for a gaming session are examples of eligibility factors that may be used to qualify a player to control of a public display's output. If a public display that a player wishes to control is already in use, a portion of the public display may be used to output the requested gaming content, with the remaining portion continuing to display the regular programming. Communication between a player device and a public display may take place over a casino communications network such as a server-based gaming network, a cable television system featuring digital "set top boxes" as found in many resorts, and/or through a public communications network.

In accordance with another exemplary embodiment, all players may be eligible to control a portion of a public display, however the actual controllable portion of the public display (or type of gaming content that may be output on the public display) may be determined based on information (e.g., player's status as a: hotel guest, comp program member) relating to one or more players. For example, any player in a casino may be able to output a small representation of their gaming outcomes in the corner of a public display or on a scrolling "ticker" at the bottom of a public display screen, while a member of the casino's comp program may be able to display a picture of himself, as well as his gaming outcomes.

In yet another "real time magic moment" embodiment, players achieving certain partial outcomes on a gaming device are permitted or required to have certain gaming content displayed on a public display. For example, upon detecting that a player has received two "7's" on a slot machine game or four cards to a royal flush in a video poker game, a casino computer (a server) may cause the broadcasting of the promising partial outcome on a public display, the ultimate resolution of the partial outcome, and/or a real time video feed of the player (taken through a lens associated with the player's gaming device, security camera, or the like). Thus, other casino patrons (e.g. at a bar area; at a bank of slot machines) can readily see other players, in real time, win or lose and see the players' reactions (smiling, cheering, etc.). The excitement generated may cause the non-gambling viewers of the excitement to feel that they are missing out on the action, and commence profitable gambling activity. In this manner, there is facilitated for individual player gaming devices the social excitement and energy associated with table games such as roulette, baccarat and craps, Numerous embodiments are described, and are presented for illustrative purposes only. The described embodiments are not intended to be limiting in any sense. These embodiments are described in sufficient detail to enable those skilled in the art to practice the invention, and it is to be understood that other embodiments may be utilized and that structural, logical, software, electrical and other changes may be made without departing from the scope of the invention. Accordingly, those skilled in the art will recognize that the invention may be practiced with various modifications and alterations. Although particular features may be described with reference to one or more particular embodiments or figures that form a part of the present disclosure, and in which are shown, by way of illustration, specific embodiments, it should be understood that such features are not limited to usage in the one or more particular embodiments or figures with reference to which they are described. The present disclosure is thus neither a literal description of all possible embodiments nor a listing of features that must be present in all embodiments.

The terms "an embodiment", "embodiment", "embodiments", "the embodiment", "the embodiments", "an exemplary embodiment", "some embodiments", "an example embodiment", "at least one embodiment", "one or more embodiments" and "one embodiment" mean "one or more (but not necessarily all) embodiments of the invention(s)" unless expressly specified otherwise. The terms "including", "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The term "comprising at least one of" followed by a listing of items does not imply that a component or subcomponent from each item in the list is required. Rather, it means that one or more of the items listed may comprise the item specified. For example, if it is said "wherein A comprises at least one of: a, b and c" it is meant that (i) A may comprise a, (ii) A may comprise b, (iii) A may comprise c, (iv) A may comprise a and b, (v) A may comprise a and c, (vi) A may comprise b and c, or (vii) A may comprise a, b and c.

The terms "a", "an" and "the" mean "one or more", unless expressly specified otherwise.

The term "based on" means "based at least on", unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term 'method' or a like term. Accordingly, any reference in a claim to a 'step' or 'steps' of a method is deemed to have sufficient antecedent basis.

Headings of sections provided in this document and the title are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required, or that each of the disclosed components must communicate with every other component. On the contrary, a variety of optional components are described to illustrate the wide variety of possible embodiments described herein.

Further, although process steps, method steps, algorithms or the like may be described in a sequential order, such processes, methods and algorithms may be configured to work in alternate orders. In other words, any sequence or order of steps that may be described in this document does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor or controller device) will receive instructions from a memory or like storage device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device article may be used in place of the more than one device or article.

The functionality and/or the features of a device may be alternatively embodied by one or more other devices which are not explicitly described as having such functionality/features. Thus, other embodiments described herein need not include the device itself.

The term "computer-readable medium" as used herein refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media may include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, an EEPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Transmission Control Protocol, Internet Protocol (TCP/IP), Wi-Fi, Bluetooth, GSM, CDMA, EDGE and EVDO.

Where databases are described, it will be understood by one of ordinary skill in the art that (i) alternative database structures to those described may be readily employed, and (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent example information only. Those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of embodiments described herein. In addition, the databases may, in a known manner, be stored locally or remotely from a device that accesses data in such a database.

It should also be understood that, to the extent that any term recited in the claims is referred to elsewhere in this document in a manner consistent with a single meaning, that is done for the sake of clarity only, and it is not intended that any such term be so restricted, by implication or otherwise, to that single meaning.

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step or" or the phrase "steps or" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Reference will now be made in detail to various exemplary and non-limiting embodiments, some examples of which are illustrated in the accompanying drawings.

As used herein, "gaming device" refers to a device that is capable, at a minimum, of displaying gaming outcomes of a wagering game. Similarly, as used herein, a "wireless gaming device" refers to a gaming device 102 configured or otherwise adapted to engage in electronic communication via a wireless medium and attendant protocol. Examples of gaming devices 102 include, but are not limited to, slot machines, video poker machines, video blackjack machines, video keno machines, and casino table games (such as baccarat, blackjack and roulette) equipped with electronic components that may facilitate embodiments described herein (e.g., electronic virtual tables with simulated cards, chips and/or dealer; "smart" tables with a live dealer and one or more electronic devices such as chip/card readers, display screens and/or player/dealer input devices; etc.).

Furthermore, as used herein, "gaming content" refers to video content that includes the display of one or more complete or partial gaming outcomes or other information associated with the one or more complete or partial gaming outcomes. Gaming content may be created by redacting and/or combining gaming information received from a gaming device 102 and/or other source. For example a controller 200 on a casino's server-based gaming network may combine a player's gaming outcome with live video of the player's reaction to the gaming outcome, and transmit the resulting game play content to a public display 106 within the casino. Gaming content may also be produced by a separate peripheral device that is operatively in communication with the public display 106. Examples of gaming content include, but are not limited to, (1) a representation of an occurrence of a game of chance (e.g. being played within a casino, on a wireless gaming device 102, etc.), (2) a representation of an initial hand of five cards in video poker, (3) a representation of the final hand of five cards in video poker, (4) a live (or delayed) broadcast of hands currently being played at a blackjack table within a casino, and (5) a live (or delayed) broadcast of a player's reaction to a gaming device 102 and/or gaming outcome.

Furthermore, as used herein, "non-gaming content" and "non-gaming media content" refers to video and/or audio content that does not involve the display of a gaming outcome. Examples of non-gaming media content include, but are not limited to (1) a sporting event such as a NFL football game, (2) a television sitcom such as Seinfeld, (3) a movie located on a storage medium such as: VHS, DVD, CD, and a computer hard-drive, (4) a television feed of a boxing match or magic show currently taking place at the casino, (5) advertisements for a restaurant or service located within a casino, and (6) casino generated promotional content for a Texas Hold 'Em tournament taking place elsewhere in a casino's poker room.

Furthermore, as used herein, "public display" refers to a display device such as a television or computer monitor (LCD, CRT, PDP, etc.), video billboard, video projector, LED display device (e.g., a screen that scrolls text using LEDs), and/or movie screen that normally operates to display non-gaming media content for viewing. A public display 106 may be considered to be a display that is (or may be) simultaneously viewable by more than one person such as a projection of content onto a wall or other smooth surface. A public display 106 typically, in normal operation, displays non-gaming media content for viewing by persons not associated with a particular wagering game or round of a wagering game. A public display 106 may have associated audio speakers (e.g., for outputting the sound of a video feed such as a hockey game or TV show). In an exemplary embodiment, these audio speakers may be considered to be part of the public display 106. In another exemplary embodiment, a public display 106 may be a portable display device or display surface.

Furthermore, as used herein, "private display" refers to a display device that may be viewed by one or more persons, typically one or more players, that, during normal operation, displays, at least in part, gaming content. For example, most gaming devices 102, including, but not limited to, standalone electronic gaming devices (slot machines, video poker machines), wireless gaming devices, and table games (virtual or smart tables), as well as tablet computers and cell phones have private displays. A private display may have associated audio speakers (e.g., headphones, or a speaker built into a slot machine).

Furthermore, as used herein, a "video output device" refers to a device that may be operatively connected to a public display 106, and may be capable of processing multiple video signals into a single output video signal (e.g., a set-top box associated with a television set, or a video card in a video server). For example, the video output device 108 may be able to process a first non-gaming media content and a second gaming content into a single split-screen video output. The video output device 108 may be capable of scaling the first content with respect to the second content based on external information relating to the viewers and/or requesters of the first and/or second content(s). The video output device 108 may also be able to switch between one or more video signals based on external factors, or factors relating to the non-gaming media content and/or gaming content. For example, the video output controller may display gaming content during the commercial breaks of a standard video content (e.g. as detected by flags, queues or keywords in the Closed Captioned circuit). In another example, the video output device may display bonus-round (gaming) content on 50% of the public display 106, when it is determined that the player of a wireless gaming device is within certain proximity of the public display 106 and has become eligible for such a bonus round. In another embodiment, the video output device 108 may open up a "picture and picture" (PIP) window for displaying gaming content, may position the window according to certain rules, and may close the window according to certain rules (e.g. when the final wheel of a slot machine resolves, the PIP window closes). In some embodiments, a video output device 108 may be internally integrated with a public display 106. While in other embodiments, the video output device 108 may be a separate unit that may be commercially available, such as a TiVo tuner.

With reference to FIG. 1, there is illustrated a system 100 consistent with one or more exemplary and non-limiting embodiments having a controller 200 (e.g., a game server; a network server) in communication with one or more gaming devices 102 and with one or more public displays 106. As illustrated, system 100 is configured to work in a network environment including a controller 200 that is in communication, via a communications network, with one or more devices, such as gaming devices 102 (e.g., slot machines, video poker machines), video output devices 108, and public displays 106. The controller may communicate with the devices 102, 108 and the public displays 106 directly or indirectly, via a wired or wireless medium such as the Internet, LAN, WAN or Ethernet, Token Ring, or via any appropriate communications means or combination of communications means. In the exemplary embodiment shown, controller 200 may communicate with each of one or more public displays 106 via an associated video output device 108.

Figure 2:
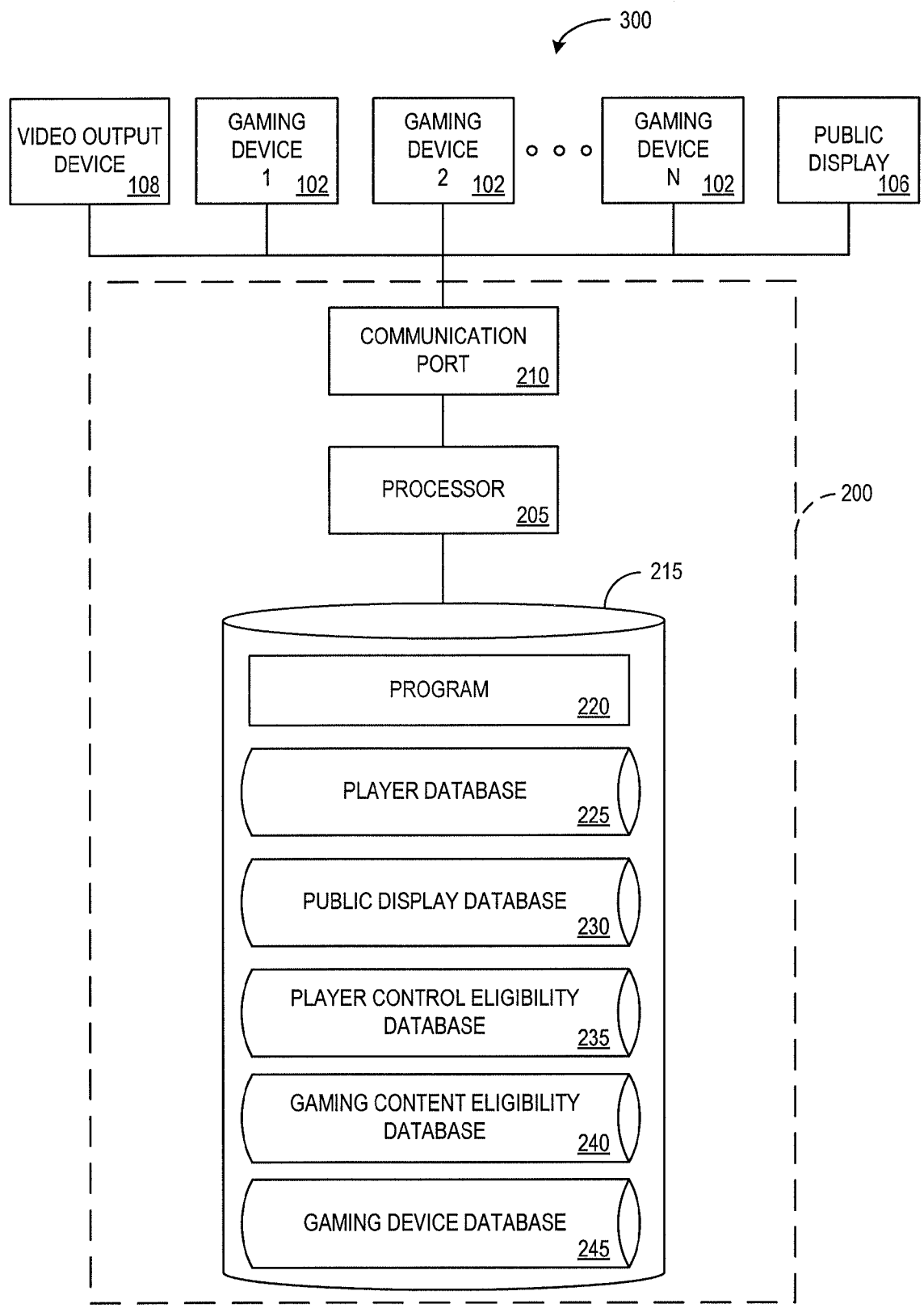
FIG. 2 is an illustration of an exemplary and non-limiting embodiment of a controller described herein.

With reference to FIG. 2, there is illustrated in more detail an exemplary and non-limiting embodiment of a controller 200. As illustrated, controller 200 is operable to communicate with one or more gaming devices 102, video output devices 108, and public displays 106. Although three gaming devices 102, one public display 106, and one video output device 108 are illustrated, any number may be utilized in practice.

The controller 200 may be implemented as a system controller, a dedicated hardware circuit, an appropriately programmed general-purpose computer, or any other equivalent electronic, mechanical or electro-mechanical device. The controller 200 may comprise, for example, one or more server computers operable to communicate with one or more client devices, such as one or more gaming devices 102, one or more video output devices 108, and/or one or more public displays 106. The controller 200 may be operative to manage the system 100 and to execute some or all of the methods described herein.

In operation, the controller 200 may function under the control of a casino, another merchant, or other entity that may also control use of the gaming devices 102. For example, the controller 200 may be a slot server in a casino. In some embodiments, the controller 200 and a slot server may be different devices. In some embodiments, the controller 200 may comprise a plurality of computers operating together. In some embodiments, the controller 200 and a gaming device 102 may be the same device.

The controller 200 comprises a processor 205, such as one or more Intel® Pentium® processors. The processor 205 is in communication with a communication port 210 (e.g., for communicating with one or more other devices, such as one or more gaming devices 102) and a memory 215. The memory 215 may comprise an appropriate combination of magnetic, optical and/or semiconductor memory, and may include, for example, Random Access Memory (RAM), Read-Only Memory (ROM), a compact disc and/or a hard disk. The processor 205 and the memory 215 may each be, for example: (i) located entirely within a single computer or other device; or (ii) connected to each other by a remote communication medium, such as a serial port cable, telephone line or radio frequency transceiver. In one embodiment, the controller 200 may comprise one or more devices that are connected to a remote server computer for maintaining databases.

The memory 215 stores a program 220 for controlling the processor 205. The processor 205 performs instructions of the program 220, and thereby operates in accordance with the invention, and particularly in accordance with the exemplary embodiments of methods described in detail herein. The program 220 may be stored in a compressed, uncompiled and/or encrypted format. The program 220 further includes program elements that may be necessary, such as an operating system, a database management system and "device drivers" for allowing the processor 205 to interface with computer peripheral devices. Appropriate program elements are known to those skilled in the art, and need not be described in detail herein. The program 220 may include computer program code that allows the controller 200 to employ the communication port 210 to communicate with, for example, a gaming device 102.

According to an exemplary embodiment, the instructions of the program 220 may be read into a main memory from another computer-readable medium, such as from a ROM to RAM. Execution of sequences of the instructions in program 220 causes processor 205 to perform the process steps described herein. In alternate exemplary embodiments, hard-wired circuitry may be used in place of, or in combination with, software instructions for implementation of the processes of the invention. Thus, exemplary embodiments are not limited to any specific combination of hardware and software.

The memory 215 may also store, (i) a player database 225; (ii) a public display database 230; (iii) a player control eligibility database 235; (iv) a gaming content eligibility database 240; and (v) a gaming device database 245. Each of the databases 230 through 245 is described in more detail below.

In some exemplary embodiments (e.g., in an embodiment in which controller 200 manages downloadable games playable on one or more gaming devices 102), the memory 215 may store additional databases. Examples of such additional databases include, but are not limited to, (i) a game database that stores information regarding one or more games playable on and/or downloadable to one or more gaming devices 102, and (ii) a scheduling and/or configuration database useful for determining which games are to be made available on which gaming devices 102.

Although the databases 230 through 245 are described as being stored in a memory 215 of controller 200, in other embodiments some or all of these databases may be partially or wholly stored, in lieu of or in addition to being stored in a memory of controller 300, in a memory of one or more other devices. Such one or more other devices may comprise, for example, one or more peripheral devices, one or more gaming devices 102, a slot server (if different from the controller 200), another device, or a combination thereof. Further, some or all of the data described as being stored in the memory 215 may be partially or wholly stored (in addition to or in lieu of being stored in the memory 215) in a memory of one or more other devices. Such one or more other devices may comprise, for example, one or more peripheral devices, one or more gaming devices 102, a slot server (if different from controller 200), another device, or a combination thereof.

Various databases that may be useful in one or more embodiments will now be described. Example structures and sample contents of (i) a public display database 230; (ii) a player control eligibility database 235; and (iii) a gaming content eligibility database 240 are shown in FIGS. 6-9, respectively. The specific data and fields illustrated in these drawings represent only some embodiments of the records stored in the databases described herein. The data and fields of these databases can be readily modified, for example, to include more or fewer data fields. A single database also may be employed. Note that in the databases a different reference numeral is employed to identify each field of each database. However, in at least one embodiment, fields that are similarly named may store similar or the same data in a similar or in the same data format.

Figure 6:
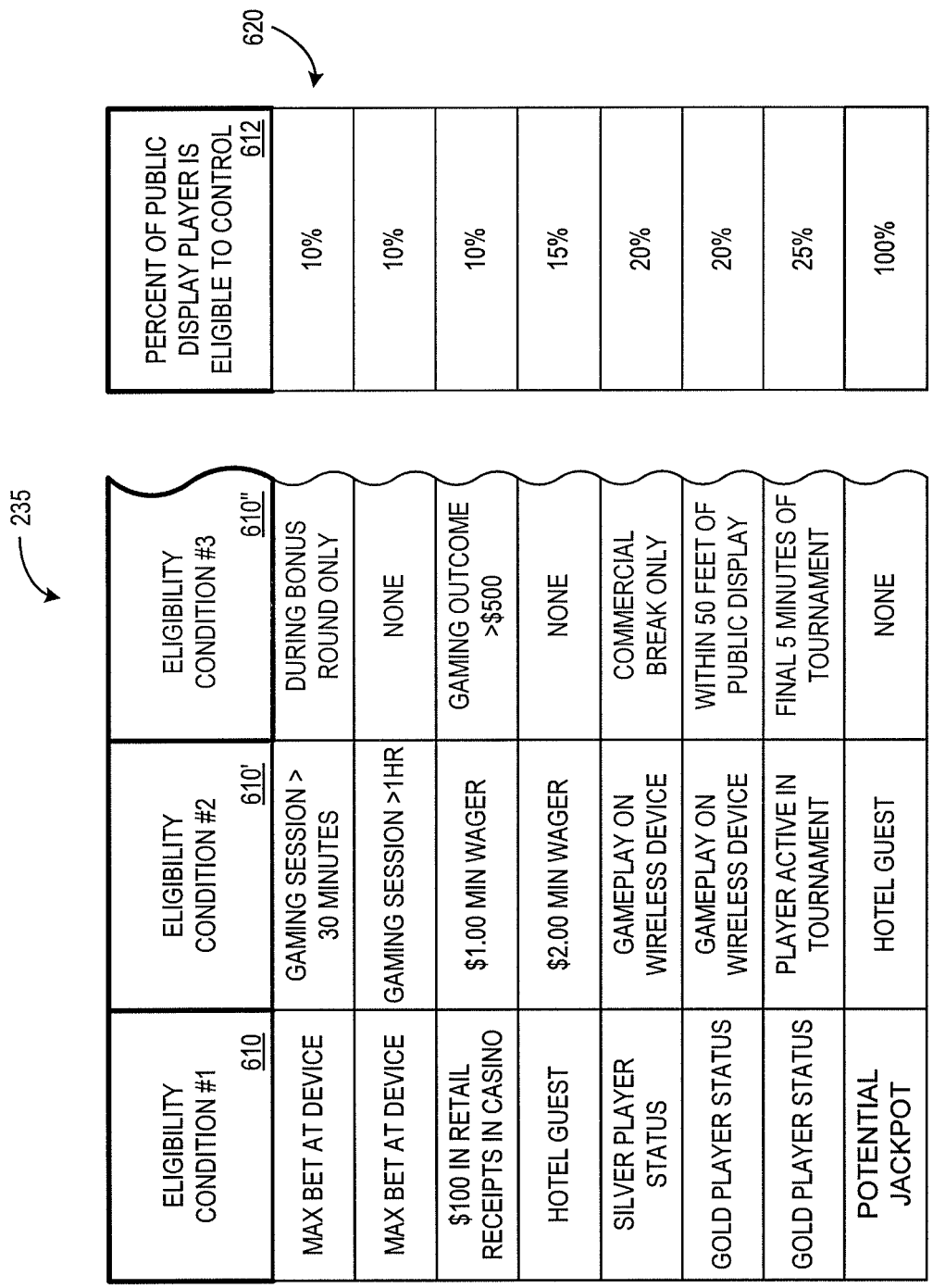
FIG. 6 is a tabular representation of an exemplary and non-limiting embodiment of a player control eligibility database described herein.

With reference to FIG. 6, there is represented, in tabular form, an exemplary and non-limiting embodiment of a player control eligibility database 235 having multiple columns comprising at least one player eligibility condition column 610, 610', 610" and a column 612 in which is represented a percentage of a public display able to be controlled by a player that meets the associated eligibility conditions. For example, with reference to row 620, when a maximum bet is detected at a device, a gaming session has been in progress for a minimum of thirty minutes, and a bonus round is in progress, all three player eligibility conditions 610, 610', 610" are met. As a result of these three conditions being met, the percent of a public display 106 that a player is eligible to control is "10%" as indicated in column 612 of row 620.

Figure 7:
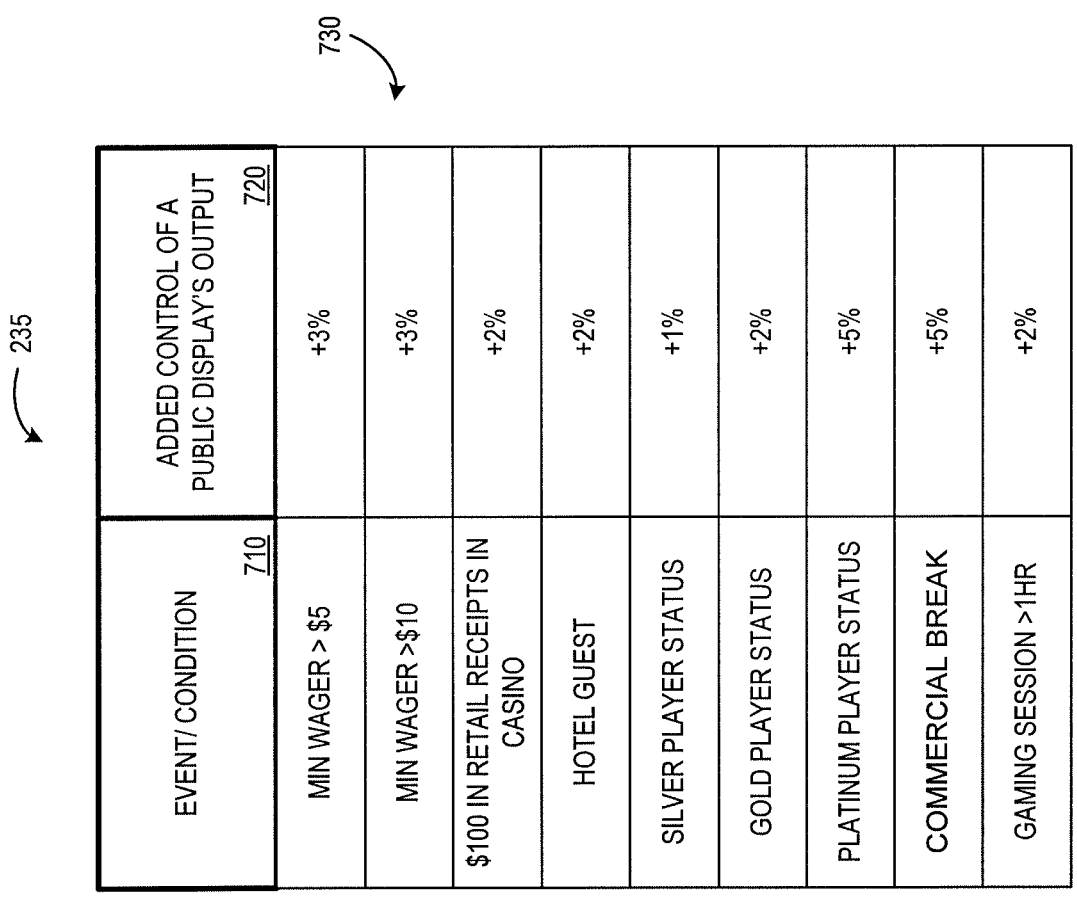
FIG. 7 is a tabular representation of another exemplary and non-limiting embodiment of a player control eligibility database described herein.

With reference to FIG. 7, there is represented, in tabular form, another exemplary and non-limiting embodiment of a player control eligibility database 235 having at least one column comprising at least one event/condition 710 and a column 720 in which is represented a percentage change of control of the output of a public display 106. For example, with reference to row 730, when a wager greater than a minimum amount of $10 is detected at a device, a value reflecting the control of the output of a public display is increased by 3%.

With reference to FIG. 8, there is illustrated, in tabular form, an exemplary and non-limiting embodiment of a gaming content eligibility database 240 having multiple columns comprising at least one gaming content preemption method column 810 and a column 815 in which is represented an amount of player comp points required to display gaming content. For example, with reference to row 820, when a player has accumulated at least four hundred comp points, the gaming content of the player is eligible to preempt the non-gaming media content of a public display 106 by displaying the outcome of the gaming content of the single player in a scrolling ticker format. In another example, illustrated with reference to row 840, when a player has accumulated at least eight hundred comp points, the gaming content of the player is eligible to preempt the non-gaming media content of a public display 106 by splitting the screen of the public display 106 so as to display both a player's jackpot win as well as non-gaming media content.

With reference to FIG. 9, there is illustrated, in tabular form, an exemplary and non-limiting embodiment of a public display database 230 having multiple columns comprising at least a display id 910 that uniquely identifies a public display, a display location 912 that identifies a location of the public display, a display size 914 indicative of a size of the display, a display type 916 that identifies a type or other description of the public display, a player eligibility requirement 918 that indicates at least one requirement for a player in order to be eligible to display content on the associated public display, and a display status 920 indicating information related to the status of the public display 106. As is evident, as described more fully below, different public displays 106 corresponding to different individual display ids 910 may be associated with different player eligibility requirements 918.

With reference to FIG. 15, there is illustrated, in tabular form, an exemplary and non-limiting embodiment of a gaming device database 245 that may be stored in the memory 215. As illustrated, gaming device database 245 includes a number of example records or entries, each defining a gaming device 102 that may be in communication (e.g., over a LAN or WAN) with controller 200. Those skilled in the art will understand that the gaming device database 245 may include any number of entries. Exemplary columns specify: (i) a gaming device identifier 1510 that uniquely identifies a particular gaming device 102 (e.g., uniquely identifies a particular slot machine on a casino floor or a PC communicating with an online casino), (ii) a gaming device type 1520 that stores a description or designation of the type of gaming device 102, and (iii) a gaming device location 1530. In other exemplary and non-limiting embodiments, gaming device database 245 may include additional columns, not shown, that may serve to associate one or more public displays 106 with individual gaming devices 102. Such information may be used when determining which public display 106 is to be utilized to display gaming content from a gaming device 102 as described more fully below.

In some exemplary and non-limiting embodiments (e.g., in an embodiment in which the controller 200 manages downloadable games playable on one or more gaming devices 102), the memory 215 may store additional databases. Examples of such additional databases include, but are not limited to, (i) a game database that stores information regarding one or more games playable on and/or downloadable to one or more gaming devices 102, and (ii) a scheduling and/or configuration database useful for determining which games are to be made available on which gaming device gaming devices 102 at what times. In other embodiments, some or all of these functions may be handled by a device distinct from controller 200.

Similarly, in one embodiment controller 200 may be operable to configure a gaming device 102 (and/or another device, such as a kiosk, POS, COP, etc.) remotely, update software stored on a gaming device 102 and/or to download software or software components to a gaming device 102. For example, controller 200 may be operable to apply a hot fix to software stored on a gaming device 102, modify a payout and/or probability table stored on a gaming device 102 and/or transmit a new version of software and/or a software component to a gaming device 102. The controller 200 may be programmed to perform any or all of the above functions based on, for example, an occurrence of an event (e.g., a scheduled event), receiving an indication from a qualified casino employee and/or other person (e.g., a regulator) and/or receiving a request from a player. In other embodiments, some or all of these functions may be handled by a device distinct from controller 200.

The controller 200 may comprise, in at least some embodiments, an electronic device (e.g., a computer) that is operable to communicate with one or more gaming devices 102. In some embodiments, controller 200 may function as a computer server and may control or direct at least some processes of gaming devices 102. Alternately, or additionally, the controller 200 may contain or otherwise be configured to read data from and/or write data to one or more databases of one or more of the gaming devices 102. Such data may comprise, for example, probability data, payout data, player data, and so on, in some embodiments, outcomes may be "centrally-determined" by controller 200 or another device that is distinct from the gaming devices 102. Such centrally-determined outcomes may then be promulgated to one or more gaming devices 102, such that they may be received by players.

In one embodiment, controller 200 may in turn be in communication with another electronic device (not shown) that is distinct from a gaming device 102, which electronic device may be operable to (i) direct the controller 200 to perform certain functions and/or (ii) read data from and/or write data to the controller 200. For example, the controller 200 may comprise a slot server or Data Collection Unit (DCU) that controls and/or communicates with a bank of gaming devices 102, which server or DCU is in turn in communication with a casino server that is in communication with a plurality of controllers 200. In another embodiment, the controller 200 may be operable to communicate with the one or more gaming devices 102 via another electronic device (e.g., a DCU), such as a server computer operable to communicate with a plurality of gaming devices 102. For example, in one embodiment, the controller 200 may be operable to communicate with a plurality of computing devices (not shown), each computing device operable to communicate with a respective plurality of gaming devices 102.

Figure 3:
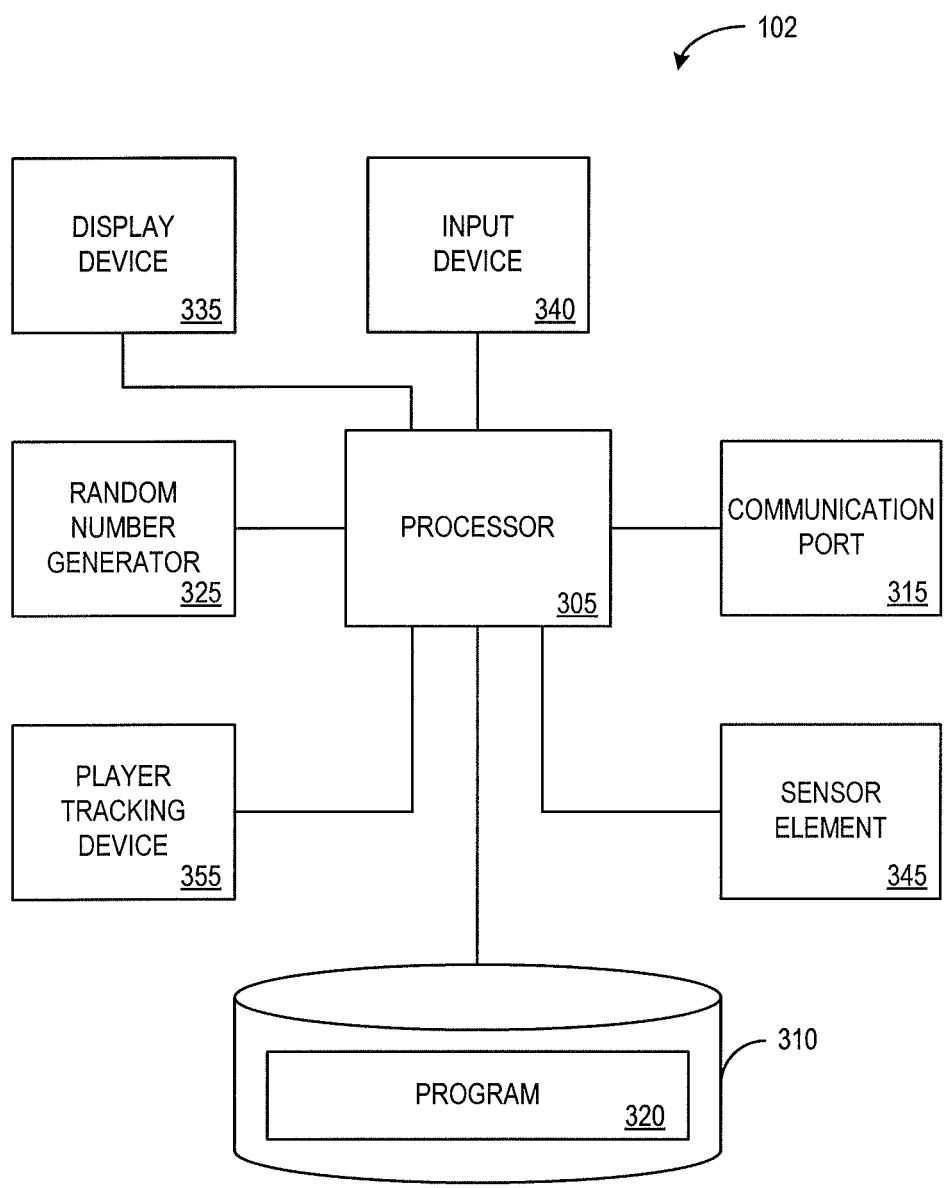
FIG. 3 is an illustration of an exemplary and non-limiting embodiment of a gaming device described herein.

With reference to FIG. 3, there is illustrated in more detail an exemplary and non-limiting embodiment of a gaming device 102. The gaming device 102 may be implemented as a system controller, a dedicated hardware circuit, an appropriately programmed general-purpose computer, or any other equivalent electronic, mechanical or electro-mechanical device. The gaming device 102 may comprise, for example, a slot machine, a video poker terminal, a video blackjack terminal, a video keno terminal, a video lottery terminal, a pachinko machine or a table-top game. In various exemplary embodiments, a gaming device 102 may comprise, for example, a personal computer (e.g., which communicates with an online casino Web site), a telephone (e.g., to communicate with an automated sports book that provides gaming services), or a portable handheld gaming device 102 (e.g., a personal digital assistant or Nintendo GameBoy). In some exemplary embodiments, the gaming device 102 may comprise a device operable to facilitate a table game (e.g., a device operable to monitor a blackjack game, such as size of a players wager, cards received and/or decisions made). The gaming device 102 may comprise any or all of the gaming devices 102 of system 100 (FIG. 1). In some exemplary embodiments, a user device such as a PDA or cell phone may be used in place of, or in addition to, some or all of the gaming device 102 components depicted in FIG. 3.

Further, a gaming device 102 may comprise a personal computer or other device operable to communicate with an online casino and facilitate game play at the online casino. In one or more exemplary embodiments, the gaming device 102 may comprise a computing device operable to execute software that simulates play of a reeled slot machine game, video poker game, video blackjack game, video keno game, video roulette game, or lottery game.

The example gaming device 102 comprises a processor 305, such as one or more Intel® Pentium® processors. The processor 305 is in communication with a communication port 315 (e.g., for communicating with one or more other devices, such as with controller 200). The processor 305 may be, for example: (i) located entirely within a single computer or other device; or (ii) connected to each other by a remote communication medium, such as a serial port cable, telephone line or radio frequency transceiver.

A memory 310 stores a program 320 for controlling the processor 305. The processor 305 performs instructions of the program 320, and thereby operates in accordance with the invention, and particularly in accordance with the methods described in detail herein. The program 320, as well as any other program for controlling a processor described herein, may be stored in a compressed, uncompiled and/or encrypted format. The following description of program 320 applies equally to all programs for directing a processor described herein. The program 320 furthermore includes program elements that may be necessary, such as an operating system, a database management system and "device drivers" for allowing the processor 305 to interface with computer peripheral devices. Appropriate program elements are known to those skilled in the art, and need not be described in detail herein.

According to an embodiment, the instructions of the program 320 may be read into a main memory from another computer-readable medium, such as from a ROM to RAM. Execution of sequences of the instructions in program 320 may cause processor 305 to perform one or more process steps described herein. In alternate embodiments, hard-wired circuitry may be used in place of, or in combination with, software instructions for implementation of the processes of the invention. Thus, embodiments described herein are not limited to any specific combination of hardware and software.

The memory 310 may also store one or more databases. For example, memory 310 may store one or more of a probability database (not shown) and a payout database (not shown).

The fields of a probability database may specify, for example: (i) a random number (or range of random numbers) that may be generated by a random number generator; and (ii) an outcome that indicates the one or more indicia comprising the outcome that corresponds to the random number of a particular record. A gaming device 102 may utilize a probability database to determine, for example, what outcome corresponds to a random number generated by a random number generator and to display the determined outcome. The outcomes may comprise the three symbols to be displayed along the payline of a three-reel slot machine. Other arrangements of probability databases are possible. For example, the book "Winning At Slot Machines" by Jim Regan (Carol Publishing Group Edition, 1997) illustrates examples of payout and probability tables and how they may be derived. The entirety of this book is incorporated by reference herein for all purposes.

The fields of a payout database may specify, for example: (i) an outcome, which indicates the one or more indicia comprising a given outcome; and (ii) a payout that corresponds to each respective outcome. If gaming device 102 comprises a three-reel slot machine, for example, the outcomes may be those obtained on a three-reel slot machine.

A gaming device 102 may utilize a payout database to determine whether a payout should be output to a player as a result of an outcome obtained for a game. For example, after determining the outcome to output on the gaming device 102, the gaming device 102 may access the payout database to determine whether the outcome for output is one of the outcomes stored as corresponding to a payout. If it is, the gaming device 102 may provide the corresponding payout to the player via a benefit output device described herein. Other arrangements of payout databases are possible. For example, the book "Winning At Slot Machines" by Jim Regan (Carol Publishing Group Edition, 1997), previously incorporated by reference, illustrates many examples of payout and probability tables and how they may be derived.

In one or more exemplary embodiments, as described, data may be stored in a memory of another device (e.g., a database of controller 200 or a database of another server device). In one or more exemplary embodiments, gaming device 102 may be operable to access the data thereof or have information associated with the data stored therein downloaded to the gaming device 102 as necessary and/or appropriate.

In one embodiment, memory 310 may store a database of events or actions on the part of the player that may trigger the gaming device 102 to transmit an indication to another device (e.g., controller 200) that a player currently playing the gaming device 102 desires, or is eligible, to display some or all of the gaming output of the player's gaming device 102 on a public display 106. Of course, in other exemplary embodiments such a list may not be stored in a database form but may rather be stored in another form (e.g., as instructions or code that comprise the program 320 or a subroutine thereof.

The processor 305 is also operable to communicate with a random number generator 325, which may be a component of gaming device 102. The random number generator 325 (as well as any other random number generator described herein), in accordance with at least one exemplary embodiment, may generate data representing random or pseudo-random values (referred to as "random numbers" herein).

The display device 335 may comprise, for example, one or more distinct display areas and/or one or more distinct display devices 335. For example, one of the display areas may display outcomes of games played on the gaming device (e.g., electronic reels of a gaming device). Another of the display areas may display rules for playing a game of the gaming device 102. Yet another of the display areas may display the benefits obtainable by playing a game of the gaming device 102 (e.g., in the form of displaying gaming output to a public display 106). Yet another of the display areas may display congratulatory messages to the player and information regarding the display of gaming content on a public display 106 such as, for example, a player's standing in a queue as described more fully below.

The processor 305 is also in communication with an input device 340, which is a device that is capable of receiving an input (e.g., from a player or another device) and which may be a component of gaming device 102. An input device may communicate with or be part of another device (e.g. a controller 200, a gaming device 102, etc.). Some examples of input devices include: a bar-code scanner, a magnetic stripe reader, a computer keyboard or keypad, a button (e.g., mechanical, electromechanical or "soft", as in a portion of a touch-screen), a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from a second gaming device or a another device such as a smart card or FDA of a player), and a weight scale. For gaming devices 102, common input devices include a button or touch screen on a video poker machine, a lever or handle connected to the gaming device, a magnetic stripe reader to read a player tracking card inserted into a gaming device, a touch screen for input of player selections during game play, and a coin and bill acceptor. Input device 340 may comprise any of the above-described input devices or any combination thereof (i.e., input device 340 may comprise more than one input device).

In some exemplary embodiments, a gaming device 102 may comprise components capable of facilitating both input and output functions (i.e., input/output devices). In one example, a touch-sensitive display screen comprises an input/output device (e.g., the device outputs graphics and receives selections from players).

Of course, as would be understood by one of ordinary skill in the art, a gaming device 102 may comprise various combinations of any or all of the component devices described herein. For example, in one or more embodiments, the gaming device may include more than one display device 335, one or more other output devices, several input devices 340, and so on (e.g., two display screens, two audio speakers, a headset, a ticket-in/ticket-out device and several buttons).

One example of a particular input device 340 that may be a component of gaming device 102 is a sensor element 345. A sensor element 345 may be a component of gaming device 102 or may be otherwise associated with gaming device 102 (and, e.g., be operable to provide information to gaming device 102). A sensor element 345 may comprise any device or combination of devices operable to detect, receive an indication of, measure, determine, and/or deduce (i) a change in a parameter, (ii) a value of a parameter, and/or (iii) a state of a device and/or parameter. In particular, in some embodiments a sensor element 345 may comprise an element, component, device, mechanism or other means for sensing information associated with a player playing the gaming device 102.

In one exemplary embodiment, the player tracking device 355 may comprise (i) a card reader (e.g., a port into which player tracking cards may be inserted), (ii) various input devices (e.g., a keypad, a touch-screen), (iii) various output devices (e.g., a small, full-color display screen), and/or (iv) combinations thereof (e.g., a touch-sensitive display screen that accommodates both input and output functions). Various commercially available devices may be suitable for such an application, such as the NextGen™ interactive player tracking panel manufactured by IGT™ or the iVIEW™ display screen manufactured by Bally® Gaming and Systems.

In a specific example, a gaming device may comprise various electronic components mounted to one or more printed circuit boards (PCBs). Such components may include various hardware described herein, such as a communications port and various controllers of peripheral devices (e.g., a display controller), as well as a memory for storing programming instructions (software) and a processor for carrying out such instructions. Forms of memory 310 that may be found in a gaming device 102 include, but are not limited to, electronically erasable programmable read-only memory (EEPROM), erasable programmable read-only memory (EPROM) and flash memory. Thus, in one or more embodiments, an EPROM storing software with instructions for carrying out aspects of the various embodiments (as well as instructions for carrying out other functions traditionally performed by the gaming device 102) may replace an EPROM previously installed in a gaming device or may be reprogrammed in accordance with one or more embodiments described herein, such that the gaming device 102 may be configured to operate in accordance with various processes described herein (e.g., requesting the display of gaming content on a public display 106).

In exemplary and non-limiting embodiment, the display device 335 and input device 340 may operate, together or separately, as a player interface. A player interface may comprise, for example, a video screen that is a touch screen operable to display such one or more such menus on the display device 335. A menu so displayed to a player may provide the player with, for example, a choice of available public displays 106, options regarding the gaming content to be displayed on a public display 106, and the like. As described more fully below, a player may be presented with a menu of options via a touch screen, for example, upon indicating a desire to display gaming content on a public display 106 via such a menu and/or upon initiating play at the gaming device 102. A player may select an option from such a menu by touching the area of the screen on which the option appears.

It should be appreciated that one or more embodiments may include storing graphic and/or sound elements that are used to construct the menu of available options. These elements may be stored, for example, in EEPROM, flash memory, hard disk, CD ROM, or in any other suitable storage device. The menu may be displayed via any suitable display device 335, such as a CRT, LCD, VFC, LED display. In one embodiment, the menu may be implemented using only dedicated electromechanical switches. In one embodiment, a player operates an input device 340 of the gaming device 102 operable to display the menu, in order to cause the menu to be displayed. In one embodiment, the device includes a touch screen and a touch screen controller (not shown) associated with a video monitor display device 335. The touch screen and touch screen controller may be operable to communicate with a video controller of the video monitor display device and a processor (e.g., a processor of gaming device 102). Thus, a player may be enabled to indicate decisions by touching the touch screen in the appropriate places.

Figure 4:
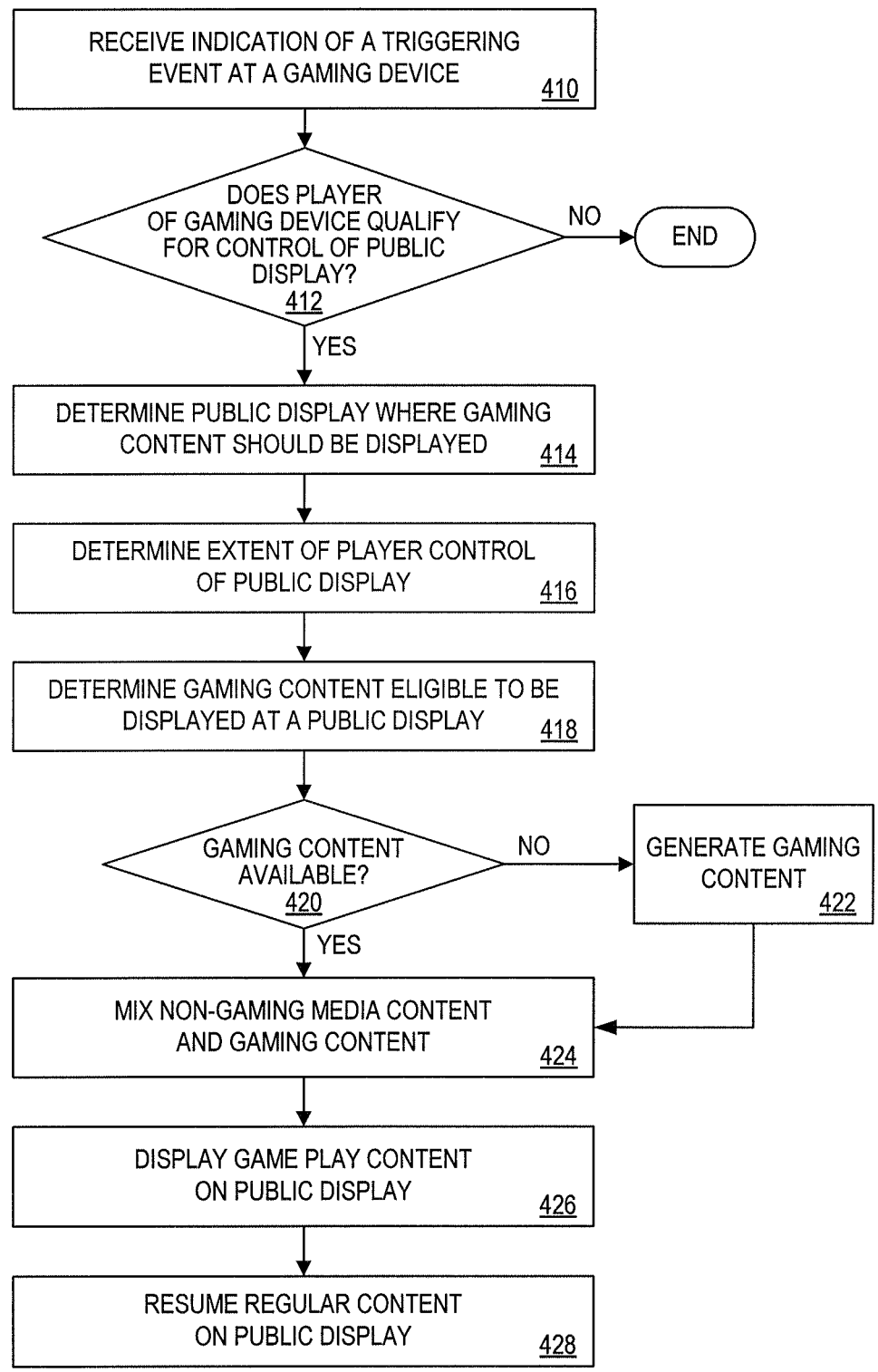
FIG. 4 is a flowchart of an exemplary and non-limiting embodiment described herein.

With reference to FIG. 4 there is illustrated a flowchart of an exemplary method according to one or more embodiments.

At step 410, an indication of an occurrence of a triggering event is received by, for example, controller 200. As used herein, "triggering event" or "trigger" refers broadly to any and all events, either observed or recorded (e.g. in a memory) and later accessed, that serve as a precondition for the performance of a step or steps. In an exemplary embodiment, described more fully below, a request from a player of a gaming device 120 may serve as a trigger to cause the controller 200 to proceed to display gaming content on a public display 106.

There follows various non-limiting and exemplary embodiments of triggering events that may be utilized in system 100.

In one exemplary embodiment, information related to one or more players of gaming devices 102 may be observed or otherwise accessed and may serve as a trigger. Examples include, but are not limited to, a change in a player's comp level status, one or more player's comp points total equaling or exceeding a predetermined threshold, and a player expressly requesting control of a public display 106.

In another exemplary embodiment, metrics relating to one or more players wager amount(s) can serve as a trigger when the value of such metrics equals, exceeds, or fails to exceed a predefined threshold level. Examples of such metrics include, but are not limited to, the total amount that one or more players wager during a specific time period, the average amount that one or more players wager during a specific time period, the rate at which one or more players may be placing wagers, and the minimum amount that one or more players must wager on each outcome of a gaming session.

In another exemplary embodiment, factors relating to one or more gaming outcomes can serve as a triggering event. Examples of such gaming outcomes may include a player hitting a $1432 jackpot on a slot machine and a player being dealt four of the five cards needed for a royal flush in video poker. Likewise, a time related to a gaming outcome, such as the time at which a winner of a tournament will be determined, may serve as a triggering event when the present e equals the time related to the gaming outcome.

In another exemplary embodiment, input from one or more sensors, such as a sensor element 345, can serve as a triggering event. Examples of such inputs include, but are not limited to, the output of motion detectors sensing a high level of activity as well as the output of one or more biometric sensors (e.g., a weight sensor, a thumbprint reader, a rangefinder, a pulse rate reader, or a thermal sensor.)

Upon receipt of an indication of a triggering event as described above with reference to step 410, a determination is made at step 412 with reference to the eligibility of a player or players of one or more gaming devices 102 to qualify to take control of a portion of a public display 106. It is to be understood that the triggering events described above may also serve to establish the eligibility of a player or players. For example, upon the receipt of an indication of an occurrence of a triggering condition, the eligibility of a player or player may be determined based upon the output of a biometric sensor, the output of which, under other conditions, might otherwise serve as a triggering event.

There follows various non-limiting and exemplary embodiments of factors that may be utilized in system 100 (e.g., by accessing player control eligibility database 235) when determining the eligibility of a player or players to take control of a public display 106.

Examples of information related to one or more players that may be utilized when determining eligibility include, but are not limited to, information related to one or more players. A player's comp level status may be used to determine eligibility. For example, players and groups of players with a higher comp level status can be given priority when determining eligibility of a player or group to control a public display 106. One or more player's comp points total may be used to determine eligibility. For example, a player may be required to have a minimum amount of comp points in order to request control of a public display 106. Information relating to a player's request for control of a public display may be used to determine eligibility. In another example, a first player may be given priority over a second player if the first player's request for control is received before the second player's request. In addition, factors relating to a player's wager amounts may be used to determine eligibility. In addition to determining the eligibility of a player to exercise control over a public display 106 to display gaming content, such eligibility criteria may be further utilized to establish a relative priority of a player's gaming content such as when more than one request for access to a public display are queued pending the availability of a public display 106. For example, players with higher average or higher total wagers may be given priority queuing over those with lower average or lower total wagers and those currently not placing wagers as described more fully below. Additional factors that may be used to determine eligibility include, but are not limited to, the total amount that one or more players wagers during a specific time period, the average amount that one or more players wagers during a specific time period, the rate at which one or more players may be placing wagers, and the minimum amount that one or more players must wager on each outcome of a gaming session.

In non-limiting and exemplary embodiments, factors relating to one or more gaming sessions may be utilized to determine the eligibility of a player or players to take control of a public display 106. Examples of such factors include, but are not limited to, the length of time of one or more player's current gaming session and the total win/loss for one or more players during a gaming session.

In other non-limiting and exemplary embodiments, factors relating to revenue generated from the one or more players at the casino property may be utilized to determine the eligibility of a player or players to take control of a public display 106. Examples of such factors include, but are not limited to, a dollar amount that one or more individuals may spend at the casino property. For example, an individual or group of individuals may be credited with points for every dollar that they spend at a casino property (i.e., room charges, food and beverage expenses, shows/entertainment). Likewise, a dollar amount that one or more individuals may commit to spend at the casino property at a later time may be utilized to determine eligibility. For example, a group of players may be allowed to display gaming content on a public display 106 if they agree to spend over $100 in food and beverages at the bar where the public display 106 is located. Similarly, a dollar amount that one or more players may commit to wager at the casino property at a later time may be utilized to determine eligibility. For example, a group of players may be allowed use of a public display 106 if they agree to place wagers totaling over $1000 during an hour use of the public display 106.

In other non-limiting and exemplary embodiments, factors relating to the number of players in a group may be utilized to determine the eligibility of a player or players to take control of a public display 106. For example, a first group of five friends requests access to a public display 106 to display a 30-minute $1.25 max bet, video poker tournament in which they are engaged. A second group of seven friends requests access to the same public display 106 for a 30-minute $1.00 max bet, video poker tournament. The second group is given priority and determined to be eligible over the first group since the second group has a greater number of group members.

In other non-limiting and exemplary embodiments, factors relating to whether or not a player is competing against one or more players may be utilized to determine the eligibility of a player or players to take control of a public display 106. For example, the reaction of a first finalist in a Texas Hold 'Em tournament may be output on 50% of a public display 106, while the reaction and cards of a second finalist in the same tournament may be displayed on the remaining 50% of the public display 106.

In other non-limiting and exemplary embodiments, a fee or payment may be required in order for a player to gain control over a public display 106. For example, an hourly fee of $50 is charged to one or more players wanting to use a public display 106 to display gaming outcomes associated with the one or more players. Alternately, the one or more players may be given the option to surrender 100 comp points per hour of public display 106 use.

In an exemplary an non-limiting embodiment, information that may be used to determine control of a public display 106 may be received by a device, such as controller 200, and/or an individual that aids in the determination of control over the public display 106. For example, player information and/or payment may be received by the controller 200. Specifically, a controller 200 operating as part of a casino's system 100, such as a server based gaming (SBG) system, may receive a request for control of a public display 106 from a player's wireless gaming device 102.

With reference to FIG. 5, there is illustrated in tabular form an exemplary and non-limiting embodiment of a player status database 225. As illustrated, player status database 225 has a player ID column 512 and a comp status column 514. Upon receipt of a request for control of a public display 106 from a player's wireless gaming device 102, the controller 200 accesses the player's comp status from player status database 510. As described more fully below, the retrieved player comp status may be utilized to determine if the player is eligible to utilize a designated public display 106.

In exemplary and non-limiting embodiments, player information and/or payment may be received by a peripheral device operatively connected to the public display 106. The peripheral device may be operatively connected to the public display 106, but may not necessarily be connected to a casino's SBG network. For example, a bill reader accepts a $5 payment from a player and consequently allows the player to control the output of an associated public display 106. Likewise, a card reader verifies that a swiped card is a valid player tracking card issued by casino's comp program. Player information or payment may be received by a casino employee or operator. It is noted that various aforementioned exemplary indications, notifications, and requests may be received from various sources including, but not limited to, (1) a player's wireless gaming device 102, (2) a casino employee or operator that may have been in contact with a player requesting control of the public display 106 (e.g., via an employee handheld or wireless device), (3) an input device located at public display 106, (4) via an object containing player information. (e.g., a player may identify himself by swiping a player tracking card at a card reader that is operatively connected to system 100), and (5) a memory devices such as a USB key or MemoryStick, With continued reference to FIG. 4, if, as a result of the performance of step 412, it is determined that the player or players are not eligible to control a public display 106, performance is terminated. Alternatively, a message may be output to a non-eligible player, informing the player of a manner in which the player may earn eligibility (e.g., by accepting an offer a player may become eligible to have the current content displayed OF by increasing his wager amount the player may become eligible to have future content displayed).Conversely, if, as a result of the performance of step 412, it is determined that the player or players are eligible to control a public display 106, processing continues to step 414 whereat there is determined the public display 106 at which gaming content is to be displayed.

In an exemplary and non-limiting embodiment, there are multiple public displays 106 in communication with controller 200 and upon which gaming content may be displayed. For example, a sports book at a casino may have ten televisions of various sizes that are used to display various sporting events (e.g., football games, basketball games, boxing matches). A waiting area at an airport may have multiple video monitors wherein, for example, one monitor is used to display the flight times of arriving and departing flights, another monitor is utilized to display the evening news, and a third monitor displays advertisements for various local attractions (e.g., casinos, shows, restaurants, amusement parks). Similarly, a gaming floor at a casino may have a big screen television that is used to display advertisements for casino attractions, and a smaller television that displays the local weather forecast for the next week.

Alternatively, in accordance with an exemplary embodiment, there may be only one public display 106 available to display gaming content (e.g., the only television in local pub where players are playing table-top video slot machines or lottery terminals). In such a case, the step of identifying or otherwise determining a public display 106 may comprise simply identifying the only available public display 106.

In an exemplary embodiment, a public display 106 may be identified before one or more players are able to control its output to display gaming content. Personal devices such as a cellular telephone, PDA, or a wireless gaming device 102 may be used to determine the location and current use of a public display 106. For example, a player in a casino may query their personal wireless gaming device 102 for the location of the nearest available public display 106. It is understood that, in such exemplary embodiments, the aforementioned determinations and responses to queries may be performed, in whole or in part, by the controller 200 and may involve accessing one or more databases such as, for example, public display database 230.

Alternately, a gaming device 102 on the casino floor may be utilized to locate the largest public display 106 within a casino property. Once the one or more public displays 106 are located, information relating to each public display 106, such as physical size, display type, or what non-gaming media content is currently being displayed, may be output to the player via the personal device, such as a gaming device 102, or a requested public display 106.

Figure 12:
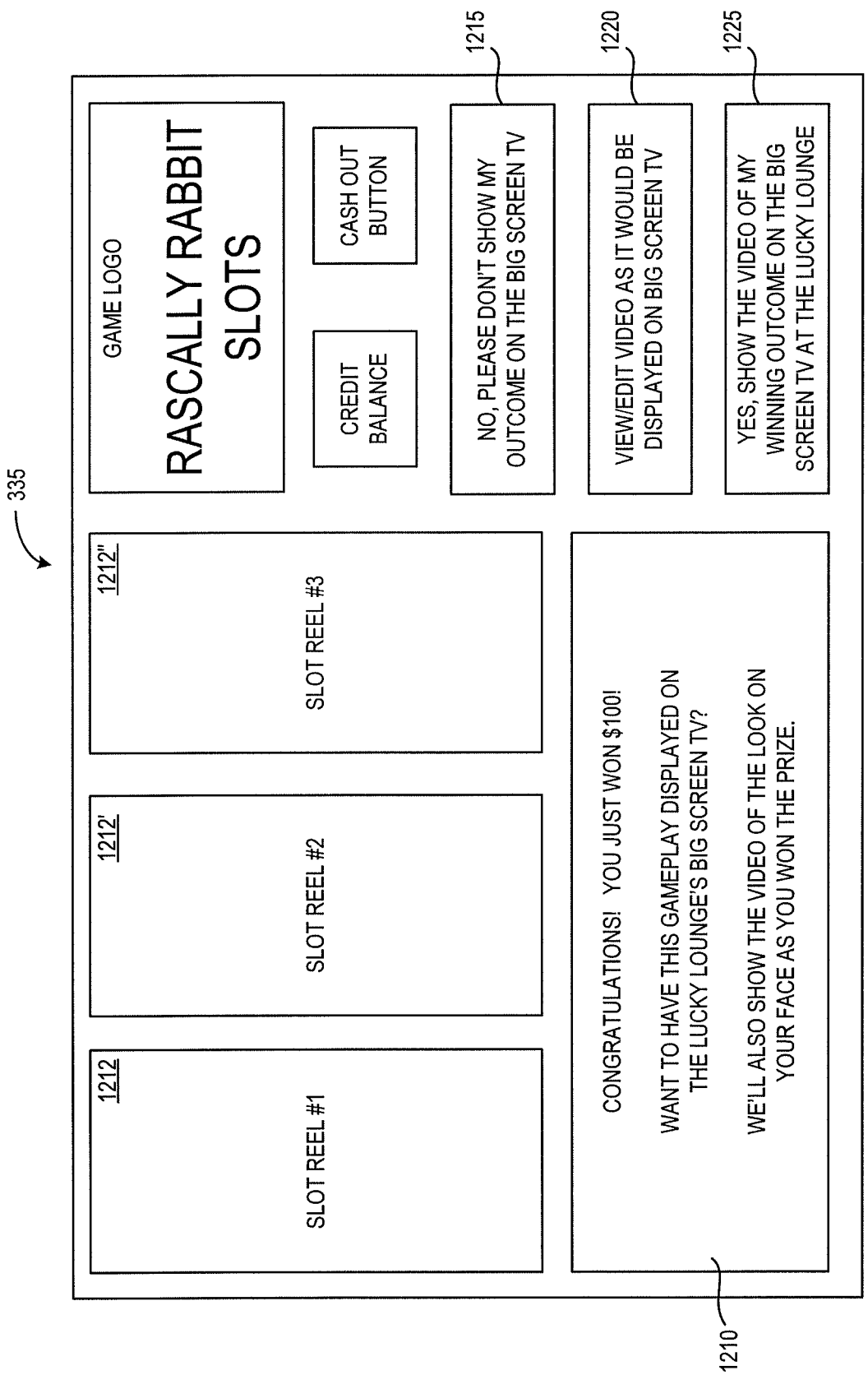
FIG. 12 is an illustration of an exemplary and non-limiting embodiment of a display device described herein.

With reference to FIG. 12, there is illustrated an exemplary and non-limiting embodiment of a display device 335 forming a part of a player's gaming device 102. As is evident, in addition to game indicia 1212'-1212", a portion of the display device 335 is comprised of information display portion 1210 whereat there is displayed, in the present example, text information inquiring if the player would like to have the game content corresponding to the player's winning of $100 dollars, as well as video of the player, displayed on a predetermined public display 106. There is further illustrated various response buttons 1215, 1220, 1225 corresponding to various possible replies by which the player may respond to the inquiry in information display portion 1210. While illustrated with reference to a textual inquiry displayed in information display portion 1210 and various predetermined responses indicated by response buttons 1215, 1220, 1225, the invention is not so limited. Rather, the invention is broadly drawn to encompass any and all methods of display and response that may be utilized to affect a selection of a public display 106 in accordance with the desires of a player.

For example, a player has just won a spin on the slot machine/gaming device 102 Wheel-of-Fortune. The player would like the spin of the wheel to be broadcast on the nearest public display 106 for other casino patrons to view. In the corner of a display device 335 of the gaming device 102 a button marked, "See me on a big screen," is blinking, indicating that it is active. The player presses the button to indicate a desired request, and the request is then relayed to controller 200. In such an instance, the controller 200 locates the nearest available public display 106 by, for example, accessing gaming device database 245 to ascertain the location of the players gaming device 102 and accessing public display database 230 to find a nearby public display 106, and outputs on the display device 335 of the gaming device 102 the following message, "Your Spin will be shown live on the Elephant Bar's big screen television!" The player then proceeds with the spin while the gaming device 102 continuously updates it's status with the controller 200. The controller 200 may then generate gaming content based on the gaming devices status, and simultaneously cause the gaming content to be output on the restaurant's television as described more fully below.

Various exemplary methods of identifying one or more public displays 106 capable of displaying gaming content may be utilized. For example, upon achieving a winning outcome on a gaming device 102 (e.g., a slot machine), a player may be prompted to select a public display 106 where an indication of the winning outcome should be displayed. In another example, a player may use GUI menu(s) on a wireless handheld gaming device 102 to indicate a desire for the most recent outcome to be displayed on a public display 106. In a further example, a group of players may win access to the bonus round in a community game. The lead player from the group may be permitted to select a public display 106 where the bonus round is displayed.

As noted above, a player may use an input device, such as the input device 340 of the gaming device 102, to help identify a public display 106. In practice, the input devices utilized to identify public displays 106 include, but are not limited to (1) wireless gaming devices 102 (e.g., a player is meeting three friends to play in a virtual slot machine tournament on individual wireless gaming devices 102. The player submits a query on his own wireless gaming device 102, so as to locate a public display 106 capable of displaying real time results of the tournament to the players. Similar to the selection of a Wireless Access Point on a personal computer or PDA, the player may see a list of available public displays 106 within wireless and/or viewing range), (2) a cellular telephone, (3) a Personal Data Assistant (FDA), (4) an information kiosk that may be located within the casino, (5) a cashless gaming receipt reader located within the casino property, (6) a gaming device 102 such as a slot machine or video poker machine (e.g., a player is playing video poker at a machine on the casino floor, but decides that he would like to complete the gaming session at a casino bar), and (7) a personal computer (e.g., a player may set up preferences related to public display 106 notifications via a personal computer and/or website prior to visiting a casino property.)

In other exemplary and non-limiting embodiments, the player may ask a casino employee or operator for help in identifying one or more public displays 106. Furthermore, a public display device 106 may identify itself to one or more players as capable of displaying gaming content as well as non-gaming media content. For example, the public display 106 may display a message saying, "Use this television to display your gaming content!" Likewise, the public display 106 may use a peripheral device, which may include another public display 106, to notify one or more players of its capability to display gaming content as well as non-gaming media content. For example, a television at a casino bar is displaying an NFL football game. However, it is determined that many of the patrons at the bar are watching the game, thus a peripheral scrolling LED device is activated with the following message, "Display your game play content on this television during commercials!" In another example, a simple light flashes on top of the television or set top box comprising the public display 106 to indicate that it is available for public display of gaming content from a gaming device 102.

In an exemplary and non-limiting embodiment, system 100 may operate to output information about one or more public displays 106 to one or more players who may subsequently indicate a choice of at least one public display 106. The information may be output via a personal electronic device such as a wireless gaming device 102. FDA or cell phone. For example, the controller 200, operatively connected to a public display 106, transmits a current status of the public displays 106 as "Not currently in use" to a group of players engaged in a video slots tournament. The group of players may each have their own wireless gaming devices 102 with private display devices 335, and may benefit from a larger public display 106 to show a real-time leader board of the tournament.

In an exemplary and non-limiting embodiment, controller 200 can output information related to one or more public displays 106 to a player or players to facilitate a selection of one or more public displays 106. Such information includes, but is not limited to, (1) the location of the public display 106 within the casino, (2) directions from the player's current location to the location of the public display 106, (3) the physical size of the public display 106, (4) the type of the physical display 106 (e.g., the player may request to be notified about plasma and LCD type televisions and not projection type televisions), (5) information relating to any payment that may be required to use the public display 106, (6) information related to the use that the public display 106 is currently being put (e.g., Three gold level players are playing "virtual roulette"), and (7) information on what the public display 106 may be used for in the future. (e.g., in 30 minutes, a large group has reserved the public display in order to view the Red Sox vs. Yankees baseball game).

In accordance with other exemplary embodiments, various methods may be employed to output information related to a public display 106 to one or more players to aid in the selection of a public display 106. For example, the controller 200 may output such information to the player via a device such as a cell phone, PDA, wireless gaming device 102, casino gaming device 102, or information kiosk. The player may also receive information relating to a public display 106 from a casino employee or operator. In addition, a player may also request to be notified at a later time based on their proximity to a public display 106. For instance, a player may wish to be notified on their wireless gaming device 102 when they are within 50 feet of a public display 106 larger than 36. The player's location may be tracked within a casino property through methods such as RFID tags or tag readers within the wireless gaming device 102 and comprising, for example, player tracking device 355. In such an instance, the controller 200 may monitor the player's location and engage in communication with an appropriate device, such as a gaming device 102, so as to notify the player.

Similarly, information related to one or more public displays 106 may be output to a group of players. For example, a player within a group requests information related to the five closest public displays 106. The player requests that the information is output to the other members of his group in order to decide which public display 106 they would all like to use as the common screen for a blackjack tournament.

After identifying a public display 106 on which is displayed non-gaming media content, there is determined, at step 416, the extent to which a player or players are to control the public display 106.

In accordance with exemplary and non-limiting embodiments, determining the level of control a player or group of players may have over the output of a public display 106 may be done by evaluating one or more previously discussed factors upon which were based determinations of player eligibility and indications of triggering events. These factors may be evaluated, for example, with respect to one or more eligibility requirements determined by a casino employee or operator, or determined dynamically by system 100, such as by controller 200.

In one exemplary embodiment, the controller 200 evaluates information to determine the extent of player control of a public display 106. For example, a player identifier and a request for control of a public display is received by the controller 200. The player identifier is used to look up additional information about the player that may be stored within a database on the controller, such as in player database 225. By referencing the player database 225, it is determined that the player is a current hotel guest and has wagered over $1000 during his current stay. Based on these factors, the player is eligible to have all bonus rounds that are played on his wireless gaming device 102 output on a public display 106.

In other exemplary embodiments, a peripheral device in communication with the public display 106 may be utilized to determine the extent to which a player or players are to control the public display 106. In addition, a casino employee or operator may aid in determining gaming content that is displayed on a public display 106. For example, the content output on the top 80% of a public display 106 may be controlled by a casino employee. The bottom 20% may be available to display player requested gaming content.

A player or group of players may be eligible to control the entire output, or a percentage of the output of a public display 106 based on the evaluation of previously discussed factors upon which were based determinations of player eligibility and indications of triggering events. In one exemplary embodiment, control over a percentage of output space on a public display 106 may be established over a specific time period. For example, a silver level player is allowed to determine the output of up to 50% of the display space on a public display 106, whereas a gold level player may determine the output of up to 75% of the display space on a public display 106. In an alternative example, a player may purchase control over 10% of the display space on a plasma television for a fee of $5 per hour. In another example, a player wishes to display the outcomes of his wireless gaming session on 50% of a television screen/public display 106 at a bar for the next hour, and thus inserts $25 into a bill reader operatively connected to the television. Alternatively, a player who has paid for a night in a casino's penthouse suite may be eligible to control 100% of the public display's output over the period of an hour.

In other exemplary embodiments, control over a percentage of output space on a public display 106 may be established over a percentage of time during a specified time period. For example, gaming content may only be displayed during commercial breaks that may occur within a standard, non-gaming video or media content. For example, a leader board for a video slots tournament may be displayed during commercial breaks of "I Love Lucy." Even in such an instance, the leader board may only, for example, occupy 25% of the output space of a public display 106.

Likewise, non-gaming media content on a public display 106 may be temporarily paused in order to display gaming content thus providing the player control of the public display 106. For example a live television broadcast of ESPN's Sportszone™ may be paused in order to display a potential royal flush outcome of a player within a casino. The television broadcast may continue from the point at which it was paused, following the display of the gaming outcome. in such instances, portions of one or more future commercial breaks may be skipped in order to resume the live broadcast of the non-gaming media content. Digital Video Recorders (DVR) such as TiVO® may be adapted/used to "pause" a live TV broadcast of non-gaming media content and thereby start recording of the broadcast. After the gaming content is displayed, the DVR may be instructed (e.g. by the Video Output Device 108) to resume the program (i.e. by beginning play of the recording) in a time shifted manner. In such instances, when gaming content "preempts" non-gaming content, the viewers are permitted to continue watching the non-gaming content where they left off (as opposed to resuming "in progress").

In another exemplary and non-limiting embodiment, the percentage of control that a player or players has over the output of a public display 106 may be established for a set time period and may be updated at the end of that time period based on historical information. For example a group of non-gaming patrons is currently watching an NFL football game on 75% of a public display 106. A group of wireless gaming device 102 players are currently having the "community cards" of their Texas Hold 'Em tournament displayed on the remaining 25% of the public display 106. After 10 minutes, it is determined that the group of player's average wagers has significantly increased. Based on this information, the wireless gaming device 102 players are now allowed to utilize 45% of the public display 106.

Having determined the extent to which a player or players are to control the public display 106, a determination is made at step 418 as to whether gaming content associated with a gaming device 102 operated by a player or players is eligible to be displayed on a public display 106. As noted above, sensitive, confidential or otherwise personal information associated with a player of a gaming device 102 may be redacted, blurred, deleted or otherwise modified so that gaming content rendered on a public display 106 is appropriate or otherwise eligible for public viewing. Such editing may be performed by the gaming device 102, the controller 200, or by a person, such as a casino personnel.

In exemplary and non-limiting embodiments, requests by a player or players to display gaming content on a public display 106 may be stored in a database (e.g., forming a part of memory 215) acting as a queue in which requests are stored. In such an example, a queue manager, possibly embodied as part of program 220 and executed at controller 200, operates to match requests for access to public displays 106 with available public displays 106 and may do so in accordance with predetermined rules governing the allocation of such resources such as may be stored in a database forming part of memory 215. For example, two players request access at approximately the same time to a public display 106 to display gaming content associated with each player, respectively. In accordance with an allocation rule that assigns priority to the player with the highest comp status, the queue manager accesses the player database 225 to determine the relative comp status of each player and proceeds to display gaming content associated with the player having a higher comp status on a public display. In other embodiments, the queue manager may operate to sequentially respond to player requests for access to public displays 106 in the order in which they are received. It is understood that in yet other exemplary and non-limiting embodiments, any manner of data related to, but not limited to, a player, a gaming device 102, a public display 106, and gaming content may be utilized by the queue manager, perhaps in accordance with one or more predetermined rules to, for example, allocate access to a public display 106, determine eligibility of a player or gaming content, or determine a parameter related thereto such as, for example, the shape and/or size of an area of a public display 106 available to a player for displaying gaming content.

After determining the gaming content eligible to be displayed on a public display 106, a determination is made at step 420 as to whether gaming content is available. In exemplary and non-limiting embodiments, gaming content to be displayed may be acquired from a gaming device 102, may be generated so as to be unique from the gaming content existing on, or output from, a gaming device 102, or may be a combination of the two.

In some exemplary embodiments, gaming content may be generated at, for example, controller 200, based on one or more gaming outcomes and information relating to a player. For example, a player named Bob Stevens has just achieved a royal flush outcome at a video poker gaming device 102. It has already been determined that Bob is eligible to have gaming content output on one or more public displays 106, thus gaming content in the form of a congratulatory message is generated. The generated gaming content may be unique from content output on a gaming device's 102 private display device 335, and may include five animated playing cards doing a dance routine over a scrolling message; "Congratulations to Bob Stevens, Today's First Royal Flush Winner!!!" In addition, for example, gaming content may be generated comprising statistical information associated with a player or group of players.

In an exemplary and non-limiting embodiment, gaming content may be generated based on input from one or more players. For example, a player may request that a graphical representation of his daily winnings be output on a portion of a public display 106, in addition to his current gaming outcomes being displayed on a private display, such as display device 335.

In another exemplary embodiment, gaming content may be generated based on one or more whole or partial gaming outcomes that may be output on a private display, such as on a display device 335. For example, two players, each of whom is in possession of a wireless gaming device 102, are randomly paired to compete against each other in ten hands of "War." A representation of the players' hands is generated and output to a public display 106.

In yet other exemplary embodiments, gaming content may be generated based on events or information relating to game play and events or information relating to one or more players including, but not limited to, a player's preferences (e.g., favorite sports team, favorite color, favorite type of slot machine), a player's hobbies and interests (e.g., sailing, golf), what language a player speaks (e.g., English, Japanese, Chinese, Polish, Spanish), a player's location (e.g., section A-123 of the casino), a player's current activity or activities (e.g., the controller 200 may detect the location of a player and display content on nearby machines that is enjoyable to or targeted at the player or a player may watch his favorite sports scores cascade across all available machines in his vicinity while playing a slot machine), demographic information about a player (e.g., a player's hometown, nationality), purchases made by a player (e.g., products, services), agreements made by a player (e.g., offers accepted), a player's gaming activities (e.g., amount of money bet, prizes won, theoretical win, comp points earned, types of games played), information about a player's visit to the casino (e.g., whether the player has a hotel room at the casino, meals consumed by the player, shows attended by the player, reservations the player has for meals or shows, etc.), friends, associates, and family members of a player, and video and/or audio of a player such as may be acquired by a gaming device 102 or a camera and/or microphone associated therewith. For example, a gaming device 102 may have a web-cam style video camera mounted to it, and it may begin recording of players upon the detection of a potentially winning outcome on a gaming device 102, such as 7-7-? on a slot machine or four cards to a royal on a video poker machine. The player's verbal and/or nonverbal reaction to the partial outcome may be recorded (the anticipation and anxiety), as may be the player's reaction to the resolution of the outcome (e.g. despair or happiness). The recording may then be shown, in accordance with one or more embodiments herein, on a public display 106. In an alternate embodiment, as discussed herein, video and/or audio of player may be provided through a public display 106 in real or substantially real time.

In yet other exemplary embodiments, gaming content may be generated based on one or more inputs from a sensor. For example, a motion detector detects a high level of movement in front of an occupied slot machine and may generate gaming content based on this activity.

In another exemplary embodiment, gaming content may be generated based on live or recorded video of a player at a gaming device 102 such as, for example, video of a player's reaction to a favorable or unfavorable gaming outcome. The video may also include the reaction of one or more additional individuals to the gaming outcome, such as a surprised sister reacting to her brother winning a large jackpot.

Figure 13:
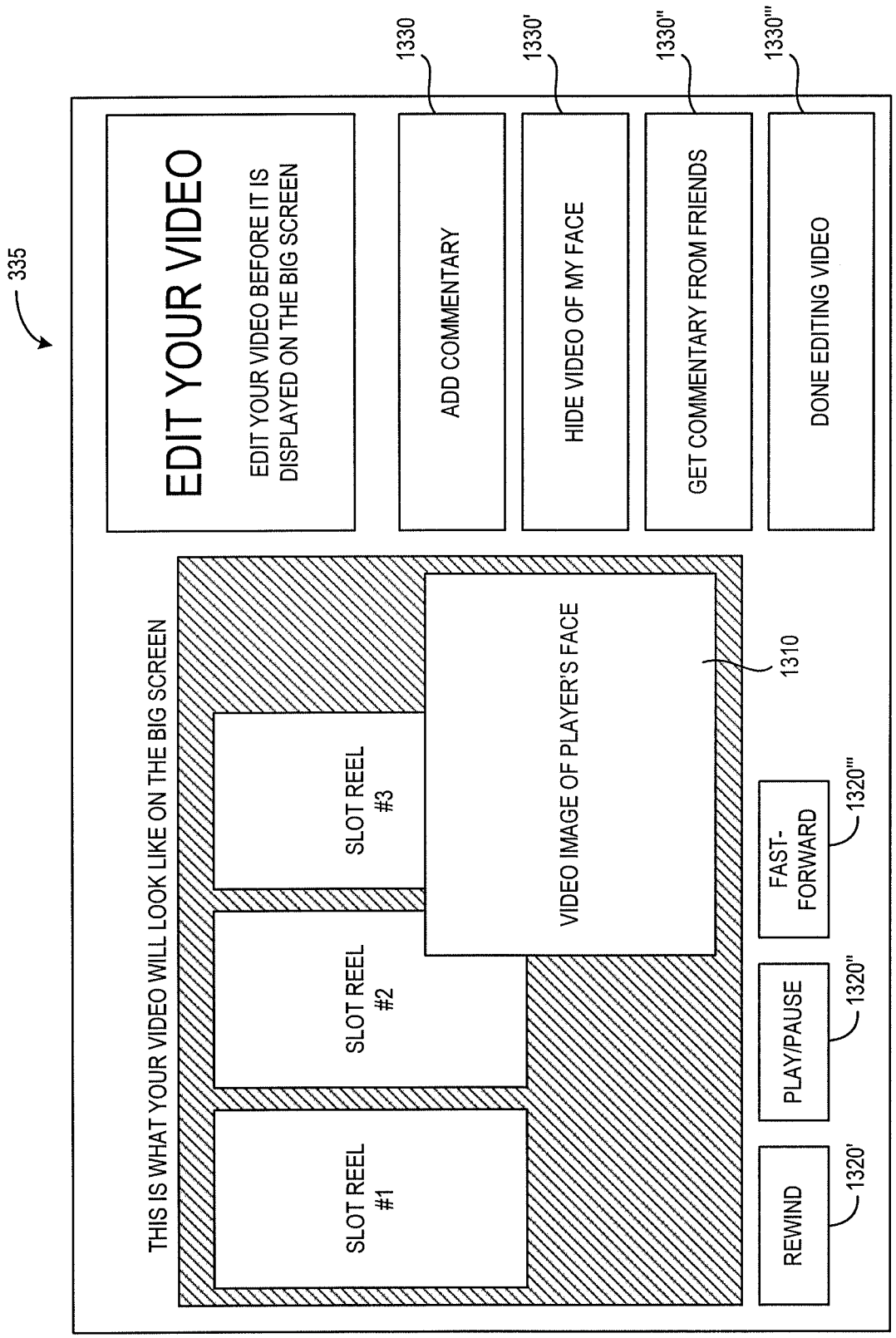
FIG. 13 is an illustration of another exemplary and non-limiting embodiment of a display device described herein.

With reference to FIG. 13, there is illustrated an exemplary and non-limiting embodiment of a player's display device 335 that may be utilized to generate gaming content as described above. Specifically, there is displayed a video image portion 1310 wherein there is displayed a video image of the player's face such as may be selected as a single frame from video footage of the player. As illustrated, various control buttons 1320-1320" are provided for the player to select a preferred frame. In addition, a plurality of edit buttons 1330-1330''' are provided to enable the player to further the edit the generated gaming content.

In another exemplary embodiment, gaming content may be generated based on an event that may occur at a casino. For example, a casino is holding a Wheel of Fortune slot tournament and may generate content by combining randomly chosen wheel spins along with a representation of a tournament leader board.

In another exemplary embodiment, gaming content may be generated based on a percentage of control that an individual may have over the output of a public display 106 such as, for example, a percentage of a public display's screen that a player may have control over. For example, a player is currently playing a "Texas Tea" slot game on a wireless gaming device 102 and requests a graphical representation of his gaming outcomes to be displayed on a public display 106. Since the player's current gaming session has been less than two hours in length, the player is eligible, for example, to have his outcomes output on 10% of a public display, and thus gaming content in the form of a "stock ticker," is generated as described more fully below. Once the player's gaming session surpasses the two-hour mark, the player is eligible to have gaming outcomes output on 25% of the public display 106, and thus gaming content in the form of an animated story may be generated. In yet another example, gaming content may be generated based on an amount of time that a player may have control of a public display 106. For example, a player may be eligible to display fifteen seconds of gaming content on a public display 106, and indicates to a casino's SBG network a desire for a video clip of the player to be output on the public display 106. A computer, such as controller 200, may then randomly combine parts of one or more recordings of the player's reaction to gaming outcomes, into a single fifteen second video clip to be output on the public display 106.

Additional examples of generated gaming content include, but are not limited to, interactive gaming content generated pursuant to which one or more individuals viewing the gaming content may provide input in response to the content. For example, live feed of a players reaction to a gaming outcome is output on a public display 106, along with a message asking, "Why is this person so happy?" A series of options such as, "He just won 200 credits", "He got a free drink" or "He just won tickets to Cirque Du Soleil," may be displayed. A benefit may be offered to any individual that answers the question correctly.

In another non-limiting example, gaming content may be generated that also incorporates a sponsorship advertisement. For example, live video of a player hitting a jackpot may be framed with text stating, "This Magic Moment brought to you by Riverboat Casino!"

In another non-limiting example, gaming content may be generated that incorporates an avatar associated with a player whose gaming content is to be displayed on a public display 106. The avatar may be generated by the controller 200 based upon information stored in, for example, player database 225. The avatar may be entirely animated or may include captured imagery or audio of the player such as, for example, a photograph of the player's face captured by a camera forming a sensor element 345. For example, a player may interactively specify an avatar of a Duke Blue Devil to be associated with the player's player id. When it is determined that a winning outcome of the player is to be displayed on a public display 106, part of the gaming content to be displayed may consist of an avatar of a Duke Blue Devil jumping up and down in an excited manner. In addition, the expression and/or actions of the avatar may be generated in correspondence to an emotion of the player detected, for example, by a sensor element 345. In an alternative embodiment, the player may specify an emotion to be expressed through the avatar.

Figure 14:
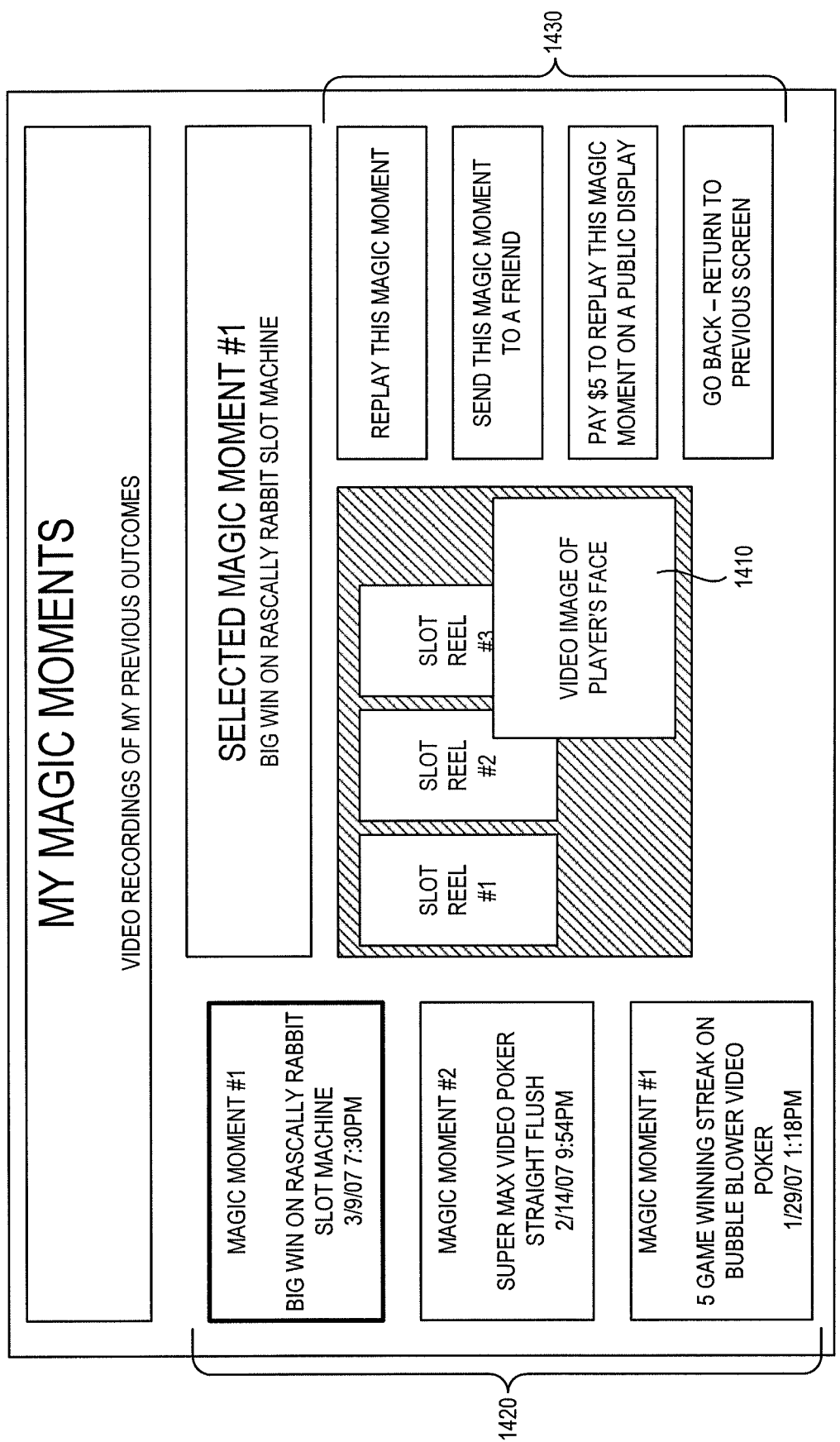
FIG. 14 is an illustration of another exemplary and non-limiting embodiment of a display device described herein.

With reference to FIG. 14, there is illustrated an exemplary and non-limiting embodiment of a player's display device 335 that may be utilized to generate gaming content as described above. Specifically, there is displayed a video image portion 1410 wherein there is displayed a video image of the player's face such as may be selected as a single frame from video footage of the player. As illustrated, the image of the player is selected from video footage associated with one of a plurality of video selections 1420. In addition, a plurality of response buttons 1430 are provided which allow the player to indicate a preference such as, for example, paying $5 to replay the magic moment on a public display 106.

Once a determination has been as to the gaming content to be displayed at steps 420 and 422, the gaming content and the non-gaming media content are combined at step 424.

In an exemplary and non-limiting embodiment, once identified, the gaming content and the non-gaming media content are combined such that the gaming content supersedes the standard video content comprising the non-gaming media content. Specifically, the gaming content and the non-gaming media content are combined into a single content, to be output to one or more public displays 106, through a casino's SBG network, a closed-circuit television system, and/or other peripheral device or communication network capable of transmitting an audio/video signal. The one or more public displays 106 receiving the audio/video signal may then output the content for viewing by one or more individuals.

In exemplary embodiments, one or more types of video content, such as the gaming content and the non-gaming media content, are combined using one or more of the following methods, in order to be output on a public display 106. In one example, the controller 200 combines multiple sources of media content into a single video output and then communicates the single video output to one or more public displays 106.

In another exemplary embodiment, a video output device 108 in communication with at least one a public display 106 and at least one gaming device 102 comprising a display device 335, may process video content from one or more source, into a single video content for display on the public display 106.

In yet another embodiment, hardware comprising a part of a public display 106 may process video content from one or more sources into a single video content for display on the public display 106. For example, a public display 106 may have inputs for one or more audio/video feeds and may be able to simultaneously output the one or more feeds via methods such as picture-in-picture.

In exemplary and non-limiting embodiments, different methods of outputting one or more types of content are employed. For example, the gaming media content and the non-gaming media content may be displayed concurrently by utilizing various display methodologies including, but not limited to, split screen, picture-in-picture (PIP), and ticker.

As a result of employing such methodologies, a portion of the non-gaming media content is superseded by gaming media content and, as a result, is obscured from view on the public display 106. For example, a ticker containing gaming content may cover up the bottom portion of a television broadcast. In such a case, a portion of the original non-gaming media content is completely hidden from view by the gaming content.

Figure 10:
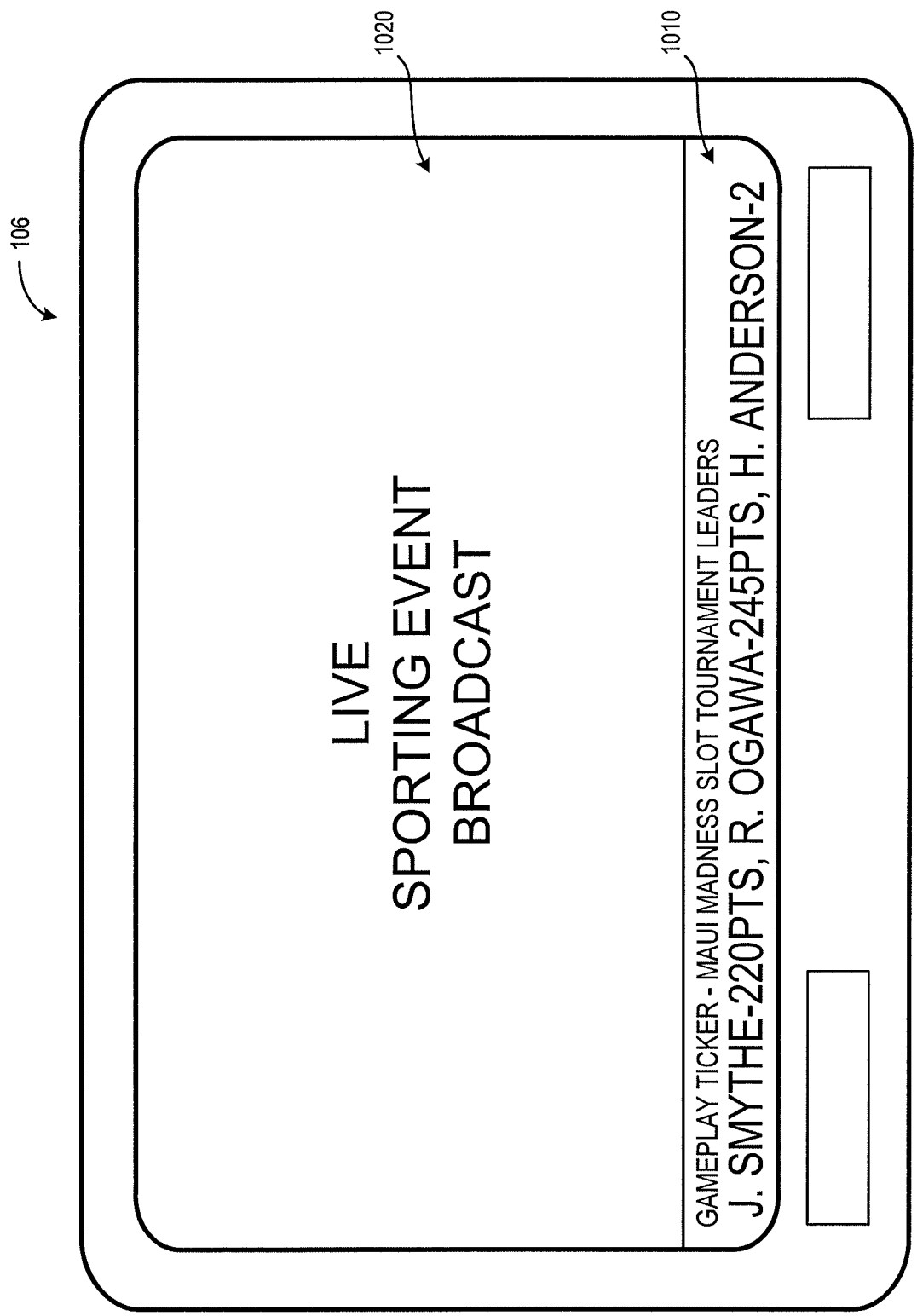
FIG. 10 is an illustration of an exemplary and non-limiting embodiment of a public display described herein.

With reference to FIG. 10, there is illustrated an exemplary and non-limiting embodiment of a public display 106 on which is displayed both non-gaming media content 1020 and gaming content 1010 in a ticker format.

In another exemplary and non-limiting embodiment, non-gaming media content that is superseded by gaming content may be resized to avoid obscuring from view any portion of the non-gaming media content. For example, in a split screen embodiment, the non-gaming media content may be resized via interpolation methods to occupy 75% of a public display's 106 screen space. The remaining 25% of screen space may be used to display gaming content.

Figure 11:
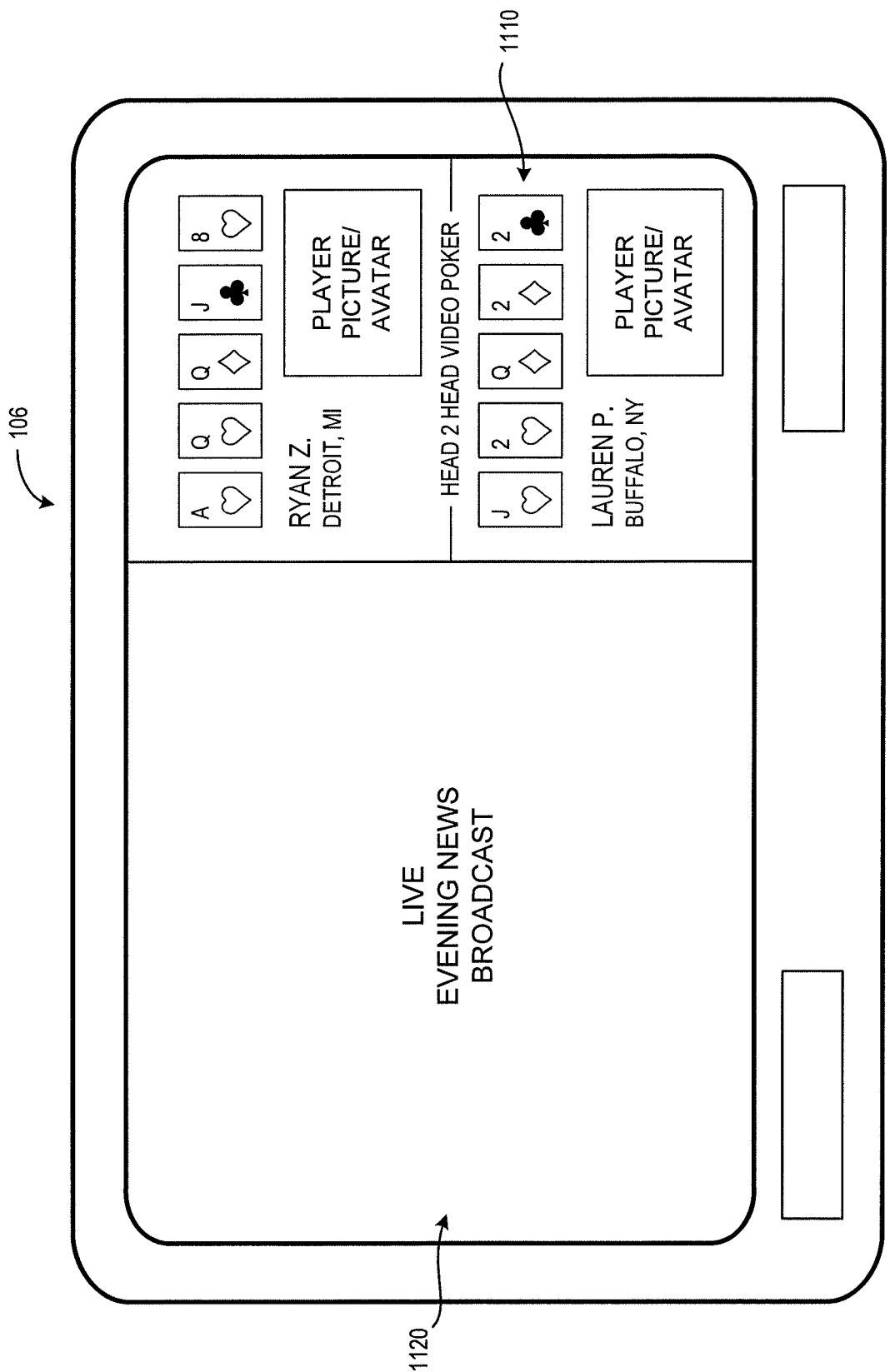
FIG. 11 is an illustration of an exemplary and non-limiting embodiment of a public display described herein.

With reference to FIG. 11, there is illustrated an exemplary and non-limiting embodiment of a public display 106 on which is displayed both non-gaming media content 1120 and gaming content 1110 in a split screen format.

In other exemplary embodiments, gaming content and non-gaming media content are displayed serially and, in some instances, one type of content may be output immediately following another type of content. In one embodiment, a second content may completely preempt or supercede a first content. For example, gaming content may displace non-gaming media content on a public display 106. In such an instance, non-gaming media content that is preempted by the gaming content is not output immediately following the conclusion of the gaming content.

In yet another embodiment, the generation and display of gaming content at a gaming device 102 may be delayed to facilitate displaying the gaming content on a public display. For example, the controller 200 determines that a player of a gaming device 102 is about to receive a winning outcome constituting a triggering event but there is no public display 106 available to display the player's reaction live. As a result, the controller 200 lengthens the amount of time each reel spins at the player's gaming device 102 thus delaying the player's reaction until such time as a public display 106 is available to display the player's reaction live.

In another exemplary and non-limiting embodiment, a second gaming content may preempt or supercede a first non-gaming media content, with the preempted non-gaming media content being recorded for display immediately following the conclusion of the gaming content. For example, a live football game that is being output on a public display 106 is paused during the display of a potential jackpot gaming outcome. Once the gaming outcome has been resolved and displayed, output of the football game on the public display 106 resumes at the point where it was paused.

In exemplary and non-limiting embodiments, different portions of a public display 106 may simultaneously display a plurality of gaming contents each associated with a different player wherein the gaming activities of each player are not associated with those of the other players. In such an embodiment, the size, shape and/or configurations of portions of the public display 106 associated with each individual player may be adjusted as the gaming content associated with new players is added or the gaming content associated with an existing player is dropped from the public display 106. For example, a public display 106 displays the gaming content of four players in four distinct portions of the public display 106 and, when another player's gaming content is added, the public display 106 is reconfigured to display five distinct portions each displaying the gaming content of a single player.

Once the non-gaming media content and the gaming content have been mixed or otherwise combined as described above with reference to step 424, the game content is transmitted to the public display at step 426.

In accordance with various exemplary and non-limiting embodiments, the transmission of content to one or more public displays 106 may be accomplished using one or more of the following methods: (1) via a communications network such as a casino's SBG system, (2) via a closed-circuit television network, (3) via a peripheral device such as a wireless audio/video transmitter/receiver pair, (4) transmitted through a television network. (e.g., Cable television network, UHF/VHF transmission, and (5) transmitted over an internet connection.

Once the game content has been transmitted to the public display at step 426, the public display 106 may resume the display of non-gaming media content as indicated at step 428.

In addition to the exemplary and non-limiting embodiments described above, other methods of acquiring gaming content for display on a public gaming device 102 may be employed that do not require a player request for gaming content to be displayed. In such embodiments, a player no longer needs to request the use of a public display in order to have the display output gaming content associated with their gaming session. Instead, gaming content may be selected from around the casino for output on a public display 106.

In one exemplary embodiment, gaming content is automatically pulled. The pulled gaming content may be chosen at random, or may be based on one or more factors relating to game play such as wager size, odds of a player winning a large payout, or a player's reactions to game play. Players that do not want all or parts of their gaming content output on a public display may choose to opt out and any time during a gaming session such as by, for example, communicating with the controller 200 via the gaming device 102.

In another exemplary embodiment, gaming content can be manually selected. In one embodiment, a human agent (e.g. a casino employee) may utilize a device, such as a computer in communication with the controller 200, to view real time information pertaining to players of gaming devices 102 on a casino floor. The information may include any of the game or player related information described herein (e.g. whole or partial outcomes, audio and/or video of players, etc.). The human agent may select certain individuals or game instances to be potentially shown on a public display 106. Selection may occur through the pressing of a button or any other enabled mode of entering data. Once one or more individuals or instances are selected, a message may be transmitted to the one or more gaming device(s) 102 associated with the one or more individuals or instances such as via the controller 200. The message may seek the player's approval to show the gaming content on a public display 106 and may be displayed, for example, on display device 335. For example, a message may read, "That was a pretty sophisticated strategy. Mind if we show a replay of your game at the hotel bar?" The player may then indicate if he approves or disapproves, and accordingly the gaming content associated with the game play information may be displayed or not.

In yet another exemplary and non-limiting embodiment, an individual that is currently watching, or intends to watch a specific public display 106 at a casino or other locale, may vote on what should be output by the public display 106. Each individual or player may each be allowed to cast single vote. As an alternative, more than one vote per individual may be allowed based on information relating to that individual or player. For example a patron at a casino bar may receive one vote for every drink he has ordered since arriving at the bar, whereas a player of a wireless gaming device 102 may receive one vote for every $5 he has lost since arriving at the bar. The number of votes an individual is allowed to cast may be based on information such as, revenue generated from the individual, a players' status in a casino's comp program, or future commitments the individual may have made. Once the votes are tallied, the winning content may be output on the public display 106. Votes may be done on a recurring basis after a specific time period has passed, or after the outputted content has concluded (E.g., a vote takes place after an episode of Seinfeld has concluded). Votes may be cast via an electronic device, such as a wireless gaming device 102, cellular telephone or PDA. Votes may be received and tallied by a central controller 200 that in turn may cause the content that receives the most number of votes to supersede the current content being output on the public display 106. As an alternative, it may convenient to vote using a simple show of hands in a case where each individual only receives a single vote. A casino employee may then tally the votes and cause the proper content to be output on the public display 106.

The invention is claimed as follows:

1. A gaming system comprising:
   at least one gaming device including:
      at least one input device, at least one gaming device display device,
at least one processor, and
at least one memory device which stores a plurality of instructions, which when executed by the at least one processor, causes the at least one processor to operate with the at least one input device and the at least one gaming device display device to, for each play of a game:
  (a) generate a game outcome,
  (b) display the generated game outcome,
  (c) determine any award associated with the generated game outcome, and
  (d) display any determined award;
at least one public display device, each public display device being separate from each of the gaming device display devices; and
at least one controller configured to communicate with the at least one gaming device and the at least one public display device, said at least one controller programmed, for a play of the game, to:
  (i) determine if a public display condition is satisfied,
  (ii) if the public display condition is satisfied, causing the at least one public display device to display, in real-time, at least one of: (A) the generated game outcome displayed by the at least gaming device display device of said gaming device associated with the satisfaction of the public display condition, and (B) any determined award displayed by the at least gaming device display device of said gaming device associated with the satisfaction of the public display condition, and
  (iii) if the public display condition is not satisfied, causing the at least one public display device to not display, in real-time, any of: (A) the generated game outcome displayed for the play of the game, and (B) any determined award displayed for the play of the game.

2. The gaming system of claim 1, which includes a plurality of public display devices, wherein if the public display condition is satisfied, the at least one controller is programmed to enable a player to select at least one of the public display devices to display, in real-time, at least one of: (A) the generated game outcome displayed by the at least gaming device display device of said gaming device associated with the satisfaction of the public display condition, and (B) any determined award displayed by the at least gaming device display device of said gaming device associated with the satisfaction of the public display condition.

3. The gaming system of claim 1, wherein the public display condition is satisfied for the play of the game if a designated partial game outcome is generated.

4. The gaming system of claim 1, wherein the public display condition is satisfied for the play of the game if a player has met at least one eligibility criteria.

5. A method of operating a gaming system, said method comprising:
  (a) for each play of a game:
    (i) causing at least one processor to execute a plurality of instructions to generate a game outcome,
    (ii) causing at least one gaming device display device to display the generated game outcome,
    (iii) causing the at least one processor to execute the plurality of instructions to determine any award associated with the generated game outcome, and
    (iv) causing the at least one gaming device display device to display any determined award; and
  (b) for a play of the game:
    (i) causing at least one controller to execute a plurality of instructions to determine if a public display condition is satisfied,
    (ii) if the public display condition is satisfied, causing at least one public display device to display, in real-time, at least one of: (A) the generated game outcome displayed by the at least gaming device display device, and (B) any determined award displayed by the at least gaming device display device, and
    (iii) if the public display condition is not satisfied, causing the at least one public display device to not display, in real-time, any of: (A) the generated game outcome displayed for the play of the game, and (B) an determined award displayed for the play of the game.

6. The method of claim 5, which includes, if the public display condition is satisfied, enabling a player to select at least one of a plurality of public display devices to display, in real-time, at least one of: (i) the generated game outcome displayed by the at least gaming device display device, and (ii) any determined award displayed by the at least gaming device display device.

7. The method of claim 5, wherein the public display condition is satisfied for the play of the game if a designated partial game outcome is generated.

8. The method of claim 5, wherein the public display condition is satisfied for the play of the game if a player has met at least one eligibility criteria.

9. The method of claim 5, which includes, if the public display condition is satisfied, causing the at least one controller to execute the plurality of instructions to determine a percentage of the at least one public display device to display, in real-time, at least one of: (i) the generated game outcome displayed by the at least gaming device display device, and (ii) any determined award displayed by the at least gaming device display device.

10. The method of claim 5, which includes, if the public display condition is satisfied, causing the at least one controller to execute the plurality of instructions to display at least one avatar associated with a player.

11. The method of claim 5, which is provided through a data network.

12. The method of claim 11, wherein the data network is an internet.

13. A non-transitory computer readable medium including a plurality of instructions, which when executed by at least one processor, cause the at least one processor to:
  (a) for each play of a game:
    (i) generate a game outcome,
    (ii) cause at least one gaming device display device to display the generated game outcome,
    (iii) determine any award associated with the generated game outcome, and
    (iv) cause the at least one gaming device display device to display any determined award; and
  (b) for a play of the game:
    (i) determine if a public display condition is satisfied in association with any of the plays of the games,
    (ii) if the public display condition is satisfied, causing at least one public display device to display, in real-time, at least one of: (A) the generated game outcome displayed by the at least gaming device display device, and (B) any determined award displayed by the at least gaming device display device, and
    (iii) if the public display condition is not satisfied, causing the at least one public display device to not display, in real-time an of: (A) the generated game outcome displayed for the play of the game, and (B) any determined award displayed for the play of the game.

14. The non-transitory computer readable medium of claim 13, wherein when executed by the at least one processor if the public display condition is satisfied, the plurality of instructions cause the at least one processor to enable a player to select at least one of the public display devices to display, in real-time, at least one of: (i) the generated game outcome displayed by the at least gaming device display device, and (ii) any determined award displayed by the at least gaming device display device.

15. The non-transitory computer readable medium of claim 13, wherein the public display condition is satisfied for the play of the game if a designated partial game outcome is generated.

16. The non-transitory computer readable medium of claim 13, wherein the public display condition is satisfied for the play of the game if a player has met at least one eligibility criteria.

17. The non-transitory computer readable medium of claim 13, wherein when executed by the at least one processor if the public display condition is satisfied, the plurality of instructions cause the at least one processor to determine a percentage of the at least one public display device to display, in real-time, at least one of: (i) the generated game outcome displayed by the at least gaming device display device, and (ii) any determined award displayed by the at least gaming device display device.

18. The non-transitory computer readable medium of claim 13, wherein when executed by the at least one processor if the public display condition is satisfied, the plurality of instructions cause the at least one processor to display at least one avatar associated with a player of a gaming device associated with the satisfaction of the public display condition.

19. A gaming system comprising:
at least one gaming device including:
  at least one input device,
  at least one gaming device display device,
  at least one processor, and
  at least one memory device which stores a plurality of instructions, which when executed by the at least one processor, causes the at least one processor to operate with the at least one input device and the at least one gaming device display device to, for each play of a game:
    (a) generate a game outcome,
    (b) display the generated game outcome,
    (c) determine any award associated with the generated game outcome, and
    (d) display any determined award;
at least one public display device, each public display device being separate from each of the gaming device display devices; and
at least one controller configured to communicate with the at least one gaming device and the at least one public display device, said at least one controller programmed to:
  (i) determine if a public display condition is satisfied in association with any of the games of any of the at least one gaming device, and
  (ii) if the public display condition is satisfied:
    (A) determine a percentage of the at least one public display device, and
    (B) causing the determined percentage of the at least one public display device to display, in real-time, at least one of: (I) the generated game outcome displayed by the at least gaming device display device of said gaming device associated with the satisfaction of the public display condition, and (II) any determined award displayed by the at least gaming device display device of said gaming device associated with the satisfaction of the public display condition.

20. A gaming system comprising:
at least one gaming device including:
  at least one input device,
  at least one gaming device display device,
  at least one processor, and
  at least one memory device which stores a plurality of instructions, which when executed by the at least one processor, causes the at least one processor to operate with the at least one input device and the at least one gaming device display device to, for each play of a game:
    (a) generate a game outcome,
    (b) display the generated game outcome,
    (c) determine any award associated with the generated game outcome, and
    (d) display any determined award;
at least one public display device, each public display device being separate from each of the gaming device display devices; and
at least one controller configured to communicate with the at least one gaming device and the at least one public display device, said at least one controller programmed to:
  (i) determine if a public display condition is satisfied in association with any of the games of any of the at least one gaming device, and
  (ii) if the public display condition is satisfied:
    (A) display at least one avatar associated with a player of the gaming device associated with the satisfaction of the public display condition, and
    (B) causing the at least one public display device to display, in real-time, at least one of: (I) the generated game outcome displayed by the at least gaming device display device of said gaming device associated with the satisfaction of the public display condition, and (II) any determined award displayed by the at least gaming device display device of said gaming device associated with the satisfaction of the public display condition.

* * * * *

UNITED STATES PATENT AND TRADEMARK OFFICE
CERTIFICATE OF CORRECTION

PATENT NO.        : 8,979,627 B2
APPLICATION NO.   : 13/896757
DATED             : March 17, 2015
INVENTOR(S)       : Jay S. Walker et al.

It is certified that error appears in the above-identified patent and that said Letters Patent is hereby corrected as shown below:

IN THE CLAIMS

In Claim 1, Column 31, Line 5, replace "causes" with --cause--.
In Claim 1, Column 31, Line 22, replace "causing" with --cause--.
In Claim 1, Column 31, Line 25, between "least" and "gaming" insert --one--.
In Claim 1, Column 31, Lines 28 to 29, between "least" and the first instance of "gaming" insert --one--.
In Claim 1, Column 31, Lines 32 to 33, replace "causing" with --cause--.
In Claim 2, Column 31, Line 43, between "least" and "gaming" insert --one--.
In Claim 2, Column 31, Line 46, between "least" and "gaming" insert --one--.
In Claim 5, Column 32, Line 7, between "least" and "gaming" insert --one--.
In Claim 5, Column 32, Line 9, between "least" and "gaming" insert --one--.
In Claim 5, Column 32, Line 14, replace "an" with --any--.
In Claim 6, Column 32, Line 20, between "least" and "gaming" insert --one--.
In Claim 6, Column 32, Line 21, between "least" and "gaming" insert --one--.
In Claim 9, Column 32, Line 34, between "least" and "gaming" insert --one--.
In Claim 9, Column 32, Line 35, between "least" and "gaming" insert --one--.
In Claim 13, Column 32, Line 59, replace "causing" with --cause--.
In Claim 13, Column 32, Line 62, between "least" and "gaming" insert --one--.
In Claim 13, Column 32, Line 64, between "least" and "gaming" insert --one--.
In Claim 13, Column 32, Lines 65 to 66, replace "causing" with --cause--.
In Claim 13, Column 32, Line 67, replace "an" with --any--.
In Claim 14, Column 33, Line 9, between "least" and "gaming" insert --one--.
in Claim 14, Column 33, Line 10, between "least" and "gaming" insert --one--.
In Claim 17, Column 33, Line 26, between "least" and "gaming" insert --one--.
In Claim 17, Column 33, Line 27, between "least" and "gaming" insert --one--.
In Claim 19, Column 34, Line 7, replace "causing" with --cause--.
In Claim 19, Column 34, Line 10, between "least" and "gaming" insert --one--.
In Claim 19, Column 34, Line 13, between "least" and "gaming" insert --one--.

Signed and Sealed this
Twenty-eighth Day of June, 2016

Michelle K. Lee
*Director of the United States Patent and Trademark Office*

CERTIFICATE OF CORRECTION (continued)
U.S. Pat. No. 8,979,627 B2

IN THE CLAIMS

In Claim 20, Column 34, Line 47, replace "causing" with --cause--.
In Claim 20, Column 34, Lines 49 to 50, between "least" and the first instance of "gaming" insert --one--.
In Claim 20, Column 34, Line 53, between "least" and "gaming" insert --one--.